United States Patent
Yamamoto et al.

(10) Patent No.: US 7,532,876 B2
(45) Date of Patent: May 12, 2009

(54) COMMUNICATION SYSTEM AND ASSOCIATED METHOD OF PERFORMING MUTUAL AUTHENTICATION

(75) Inventors: Kazuyuki Yamamoto, Kanagawa (JP); Shin Iima, Tokyo (JP)

(73) Assignee: Sony Corporation, Tokyo (JP)

( * ) Notice: Subject to any disclaimer, the term of this patent is extended or adjusted under 35 U.S.C. 154(b) by 45 days.

(21) Appl. No.: 10/949,229

(22) Filed: Sep. 27, 2004

(65) Prior Publication Data
US 2005/0101294 A1    May 12, 2005

(30) Foreign Application Priority Data
Sep. 29, 2003  (JP)  ............... 2003-338310

(51) Int. Cl.
H04M 1/66  (2006.01)
H04B 7/00  (2006.01)
H04K 1/00  (2006.01)
H04L 9/00  (2006.01)

(52) U.S. Cl. .................. 455/411; 455/410; 455/522; 455/435.1; 380/247; 380/259; 380/260; 340/5.26; 340/5.74; 340/5.8; 713/169; 713/170; 713/171; 726/2

(58) Field of Classification Search .............. 455/411, 455/41.2, 502, 522, 552, 436, 410, 435, 41.3; 380/247, 248, 249, 255, 259, 260, 270; 340/5.26, 340/5.74, 5.8; 713/168, 169, 170, 171; 726/2
See application file for complete search history.

(56) References Cited

U.S. PATENT DOCUMENTS

| 5,430,761 | A | * | 7/1995 | Bruckert et al. | ............. | 375/144 |
| 6,148,205 | A | * | 11/2000 | Cotton | .................... | 455/435.1 |
| 6,928,295 | B2 | * | 8/2005 | Olson et al. | .................. | 455/522 |
| 7,243,232 | B2 | * | 7/2007 | Vanstone et al. | ............ | 713/171 |
| 2001/0051530 | A1 | * | 12/2001 | Shiotsu et al. | .............. | 455/522 |
| 2002/0197979 | A1 | * | 12/2002 | Vanderveen | ................ | 455/410 |
| 2004/0259547 | A1 | * | 12/2004 | Lau et al. | .................... | 455/436 |

* cited by examiner

Primary Examiner—George Eng
Assistant Examiner—Wesley L Kim
(74) Attorney, Agent, or Firm—Oblon, Spivak, McClelland, Maier & Neustadt, P.C.

(57) ABSTRACT

A reception intensity measuring unit measures a reception intensity of a radio wave received by a radio reception unit under control of a connection control unit. When it is judged that the reception intensity of the received radio wave is larger than a reception intensity set in advance, the reception intensity measuring unit controls a transmission intensity changing unit to lower a transmission intensity of a radio wave to be transmitted from a radio transmission unit. When the transmission intensity of the radio wave to be transmitted from the radio transmission unit is lowered by the transmission intensity changing unit, an authentication processing unit executes authentication processing with another apparatus via the radio reception unit and the radio transmission unit and controls an authentication data registering unit to register authentication data, which is obtained as a result of the authentication processing, in a memory.

4 Claims, 15 Drawing Sheets

COMMUNICATION SYSTEM AND ASSOCIATED METHOD OF PERFORMING MUTUAL AUTHENTICATION

BACKGROUND OF THE INVENTION

1. Field of the Invention

The present invention relates to a communication system, an information processing apparatus and method, a recording medium, and a program, and in particular, to a communication system, an information processing apparatus and method, a recording medium, and a program that make it possible to perform mutual authentication easily at low cost.

2. Description of the Related Art

In recent years, networks have been widely used the society, and a domestic network has started to be established using electronic devices and the like. In the case in which such a domestic network is established, a network interface corresponding to electronic devices at home has to be mounted on the electronic devices, which results in an increase in cost and troubles in wiring of cables to be connected. Thus, it has been proposed to establish a domestic network by radio communication.

In the case in which a network is established by radio communication, it is difficult to perform mutual authentication of electronic devices that a user wishes to connect to the network. Thus, as indicated in JP-A-2003-178272, an electronic device, which is adapted to perform mutual authentication utilizing electromagnetic induction, has been proposed.

However, the electronic device described in JP-A-2003-178272 requires a communication unit for authentication that performs mutual authentication utilizing electromagnetic induction in addition to a communication unit that performs data communication. Thus, there is a problem in that cost is increased by adding the communication unit for authentication. In particular, in the case in which the electronic device is applied to a portable electronic device, there is a problem in that a size of the electronic device itself is increased by adding the communication unit for authentication.

Moreover, even if it is possible to apply the electronic device described in JP-A-2003-178272 to a large-size electronic device set at home, it is difficult to apply the electronic device to a portable electronic device. In other words, in the case in which a user puts the portable electronic device, which performs mutual authentication as described above, in a bag and carries the portable electronic device to a public place (e.g., a crowded train), there is a problem in that the portable electronic device is likely to be authenticated by a holder in bad faith without permission through the bag. In addition, in the case in which the portable electronic device has been authenticated without permission, there is a problem in that individual information and data stored in the electronic device are likely to be intercepted.

SUMMARY OF THE INVENTION

The invention has been devised in view of such circumstances and makes it possible to perform mutual authentication easily at low cost.

A communication system of the invention is characterized in that a first information processing apparatus transmits a radio wave of a first transmission intensity to a second information processing apparatus, receives a response radio wave corresponding to the transmitted radio wave from the second information processing apparatus, judges whether a reception intensity of the received response radio wave is larger than a reception intensity set in advance, when it is judged that the reception intensity of the response radio wave is larger than the reception intensity set in advance, lowers a transmission intensity of a radio wave to be transmitted to a second transmission intensity that is a required minimum transmission intensity receivable by the second information processing apparatus, and executes authentication processing with the second information processing apparatus using a radio wave of the second transmission intensity, and the second information processing apparatus receives a radio wave transmitted from the first information processing apparatus, judges whether a reception intensity of the received radio wave is larger than a reception intensity set in advance, when it is judged that the reception intensity of the radio wave is larger than the reception intensity set in advance, transmits a response radio wave corresponding to the received radio wave to the first information processing apparatus at a third transmission intensity, lowers a transmission intensity of a radio wave to be transmitted to a fourth transmission intensity that is a required minimum transmission intensity receivable by the first information processing apparatus, and executes authentication processing with the first information processing apparatus using a radio wave of the fourth transmission intensity.

The communication system can be arranged such that the first transmission intensity of a radio wave to be transmitted by the first information processing apparatus and the third transmission intensity of a radio wave to be transmitted by the second information processing apparatus are standardized and made substantially identical.

The communication system can be arranged such that at least one of the first information processing apparatus and the second information processing apparatus includes an operation input unit that is operated by a user when authentication processing is performed, judges whether authentication processing is performed on the basis of operation information inputted by the operation input unit, and when it is judged that the authentication processing is performed, judges whether the reception intensity of the received radio wave is larger than the reception intensity set in advance.

The communication system can be arranged such that the first information processing apparatus and the second information processing apparatus include an operation input unit that is operated by a user when authentication processing is performed, judge whether authentication processing is performed on the basis of operation information inputted by the operation input unit, and when it is judged that the authentication processing is performed, judge whether the reception intensity of the received radio wave is larger than the reception intensity set in advance.

The communication system can be arranged such that the first information processing apparatus registers authentication data necessary for communication with the second information processing apparatus, which is obtained as a result of authentication, and performs data communication with the second information processing apparatus using a radio wave of the first transmission intensity on the basis of the registered authentication data, and the second information processing apparatus registers authentication data necessary for communication with the first information processing apparatus, which is obtained as a result of authentication, and performs data communication with the first information processing apparatus using a radio wave of the third transmission intensity on the basis of the registered authentication data.

An information processing apparatus of the invention is characterized by including: a radio transmission unit that transmits a radio wave of a predetermined first transmission intensity to another information processing apparatus; a radio reception unit that receives a radio wave from the other information processing apparatus; a radio wave intensity judging unit that judges whether a reception intensity of the radio wave received by the radio reception unit is larger than a reception intensity set in advance; a radio wave intensity setting unit that, when it is judged by the radio wave intensity judging unit that the reception intensity of the radio wave is larger than the reception intensity set in advance, lowers a transmission intensity of a radio wave to be transmitted by the radio wave transmission unit to a second transmission intensity that is a required minimum transmission intensity receivable by the other information processing apparatus; and an authentication execution unit that executes authentication processing with the other information processing apparatus using a radio wave of the second transmission intensity lowered by the radio wave intensity setting unit.

The information processing apparatus can be arranged to further include: an operation input unit that is operated by a user when authentication processing is performed; and an authentication judging unit that judges whether authentication processing by the authentication execution unit is performed on the basis of operation information inputted by the operation input unit, wherein, when it is judged by the authentication judging unit that the authentication processing is performed, the radio wave intensity judging unit judges whether the reception intensity of the radio wave received by the radio reception unit is larger than the reception intensity set in advance.

The information processing apparatus can be arranged to further include: a registration unit that, after the authentication processing by the authentication execution unit is executed, registers authentication data necessary for communication with the other information processing apparatus that is obtained as a result of authentication by the authentication execution unit; and a data communication unit that performs data communication with the other information processing apparatus using a radio wave of the first transmission intensity on the basis of the authentication data registered by the registration unit.

The information processing apparatus can be arranged to further include: an information transmission unit that transmits calling information for confirming apparatuses present in a range, in which a radio wave of the first transmission intensity is receivable, using the radio wave of the first transmission intensity; an information reception unit that receives response information from the other information processing apparatus that receives the calling information transmitted by the information transmission unit; and an authenticated apparatus judging unit that judges whether the other information processing apparatus is an authenticated apparatus on the basis of the response information received by the information reception unit and the authentication data registered by the registration unit, wherein, when it is judged by the authenticated apparatus judging unit that the other information processing apparatus is an authenticated apparatus, the data communication unit performs data communication with the other information processing apparatus using the radio wave of the first transmission intensity.

The information processing apparatus can be arranged to further include: an information reception unit that receives calling information for confirming apparatuses present in a range of a receivable distance of the other information processing unit from the other information processing unit; an information transmission unit that transmits response information responding to the calling information received by the information reception unit using a radio wave of the first transmission intensity on the basis of the authentication data registered in the registration unit; and a connection permission judging unit that judged whether a connection permission signal is received from the other information processing apparatus in response to the response information transmitted by the information transmission unit, wherein, when it is judged by the connection permission judging unit that the connection permission signal is received from the other information processing apparatus, the data communication unit performs data communication with the other information processing apparatus using the radio wave of the first transmission intensity.

An information processing method of the invention is characterized by including: a radio transmission step of transmitting a radio wave of a predetermined first transmission intensity to an information processing apparatus; a radio reception step of receiving a radio wave from the information processing apparatus; a radio wave intensity judgment step of judging whether a reception intensity of the radio wave received by processing of the radio reception step is larger than a reception intensity set in advance; a radio wave intensity setting step of, when it is judged by processing of the radio wave intensity judgment step that the reception intensity of the radio wave is larger than the reception intensity set in advance, lowering a transmission intensity of a radio wave to be transmitted to a second transmission intensity that is a required minimum transmission intensity receivable by the information processing apparatus; and an authentication execution step of executing authentication processing with the information processing apparatus using a radio wave of the second transmission intensity lowered by processing of the radio wave intensity setting step.

A recording medium of the invention having recorded therein a program is characterized in that the program causes a computer to execute processing including: a radio transmission step of transmitting a radio wave of a predetermined first transmission intensity to an information processing apparatus; a radio reception step of receiving a radio wave from the information processing apparatus; a radio wave intensity judgment step of judging whether a reception intensity of the radio wave received by processing of the radio reception step is larger than a reception intensity set in advance; a radio wave intensity setting step of, when it is judged by processing of the radio wave intensity judgment step that the reception intensity of the radio wave is larger than the reception intensity set in advance, lowering a transmission intensity of a radio wave to be transmitted to a second transmission intensity that is a required minimum transmission intensity receivable by the information processing apparatus; and an authentication execution step of executing authentication processing with the information processing apparatus using a radio wave of the second transmission intensity lowered by processing of the radio wave intensity setting step.

A program of the invention is characterized by causing a computer to execute processing including: a radio transmission step of transmitting a radio wave of a predetermined first transmission intensity to an information processing apparatus; a radio reception step of receiving a radio wave from the information processing apparatus; a radio wave intensity judgment step of judging whether a reception intensity of the radio wave received by processing of the radio reception step is larger than a reception intensity set in advance; a radio wave intensity setting step of, when it is judged by processing of the radio wave intensity judgment step that the reception intensity of the radio wave is larger than the reception intensity set in advance, lowering a transmission intensity of a radio wave to be transmitted to a second transmission intensity that is a required minimum transmission intensity receivable by the information processing apparatus; and an authentication execution step of executing authentication processing with the information processing apparatus using a radio wave of the second transmission intensity lowered by processing of the radio wave intensity setting step.

According to the first invention, a radio wave of the first transmission intensity is transmitted to the second information processing apparatus by the first information processing apparatus, a response radio wave corresponding to the transmitted radio wave is received from the second information processing apparatus, it is judged whether a reception intensity of the received response radio wave is larger than the reception intensity set in advance, when it is judged that the reception intensity of the response radio wave is larger than the reception intensity set in advance, a transmission intensity of a radio wave to be transmitted is lowered to the second transmission intensity that is a required minimum transmission intensity receivable by the second information processing apparatus, and authentication processing with the second information processing apparatus is executed using a radio wave of the second transmission intensity. Then, the radio wave transmitted from the first information processing apparatus is received by the second information processing apparatus, it is judged whether a reception intensity of the received radio wave is larger than a reception intensity set in advance, when it is judged that the reception intensity of the radio wave is larger than the reception intensity set in advance, a response radio wave corresponding to the received radio wave is transmitted to the first information processing apparatus at the third transmission intensity, a transmission intensity of a radio wave to be transmitted is lowered to the fourth transmission intensity that is a required minimum transmission intensity receivable by the first information processing apparatus, and authentication processing with the first information processing apparatus is executed using a radio wave of the fourth transmission intensity.

According to the second invention, a radio wave of the predetermined first transmission intensity is transmitted to the information processing apparatus, a radio wave from the information processing apparatus is received, it is judged whether a reception intensity of the received radio wave is larger than the reception intensity set in advance, when it is judged that the reception intensity of the radio wave is larger than the reception intensity set in advance, a transmission intensity of a radio wave to be transmitted is lowered to the second transmission intensity that is a required minimum transmission intensity receivable by the information processing apparatus. Then, authentication processing with another information processing apparatus is executed using a radio wave of the lowered second transmission intensity.

Communication may be not only radio communication and wire communication but also communication in which the radio communication and the wire communication are mixed, that is, communication in which the radio communication is performed in certain sections and the wire communication is performed in other sections. Moreover, communication may be such communication in which the wire communication from a certain apparatus to another apparatus is performed by the wire communication and communication from the other apparatus to the certain apparatus is performed by the radio communication.

DESCRIPTION OF THE PREFERRED EMBODIMENTS

Figure 1:
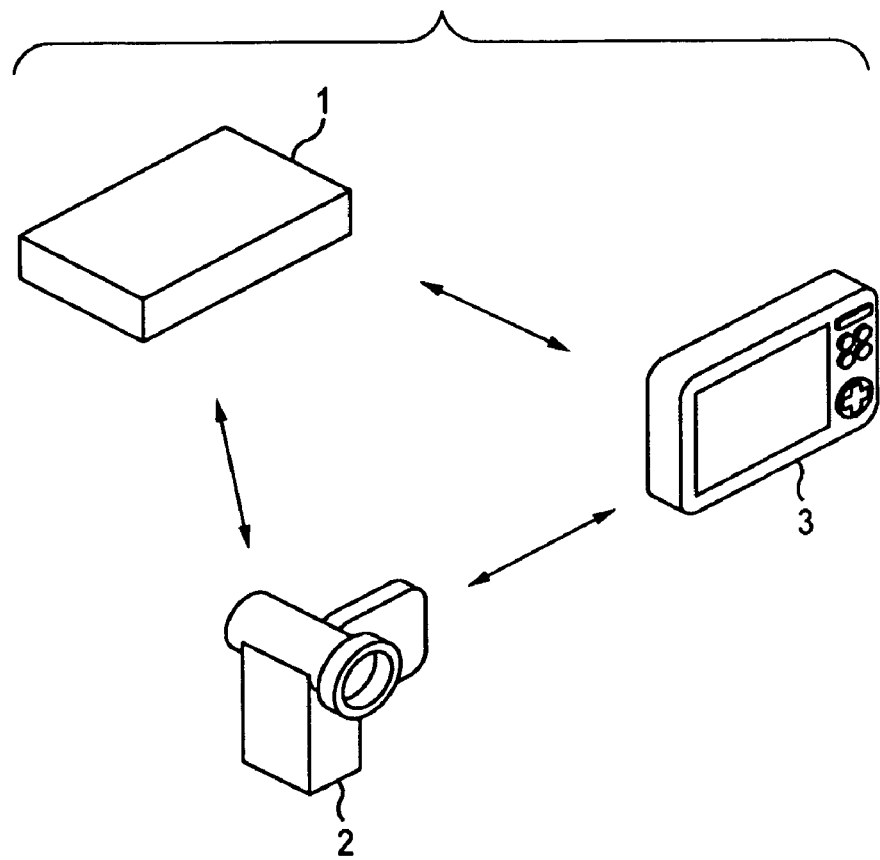
FIG. 1 is a diagram showing an example of a structure of a radio communication system according to the invention.

A best mode of the invention will be hereinafter explained. A correspondence relation between the invention to be disclosed and embodiments is illustrated as follows. Even if there is an embodiment that is described in the specification but is not described herein as an embodiment corresponding to an invention, this does not means that the embodiment does not correspond to the invention. To the contrary, even if an embodiment is described herein as an embodiment corresponding to an invention, this does not mean that the embodiment does not correspond to inventions other than the invention.

Moreover, this description does not refer to all inventions described in the specification. In other words, this description does not deny presence of an invention that is described in the specification but is not claimed in this application, that is, presence of an invention that will be applied for a patent by a divisional application or appear according to amendment to be added.

According to the invention, a communication system, which communicates data between a first information processing apparatus (e.g., a portable server 1 in FIG. 1) and a second information processing apparatus (e.g., an image pickup apparatus 2 in FIG. 1), is provided. This communication system is characterized in that the first information processing apparatus (e.g., the portable server 1 in FIG. 1) transmits a radio wave of a first transmission intensity to the second information processing apparatus (e.g., step S2 in FIG. 11), receives a response radio wave corresponding to the transmitted radio wave from the second information processing apparatus (e.g., step S3 in FIG. 11), judges whether a reception intensity of the received response radio wave is larger than a reception intensity set in advance (e.g., step S4 in FIG. 11), when it is judged that the reception intensity of the response radio wave is larger than the reception intensity set in advance, lowers a transmission intensity of a radio wave to be transmitted to a second transmission intensity that is a required minimum transmission intensity receivable by the second information processing apparatus (e.g., step S5 in FIG. 11), and executes authentication processing with the second information processing apparatus using a radio wave of the second transmission intensity (e.g., step S6 in FIG. 12), and the second information processing apparatus (e.g., the image pickup apparatus 2 in FIG. 1) receives a radio wave transmitted from the first information processing apparatus (e.g., step S22 in FIG. 11), judges whether a reception intensity of the received radio wave is larger than a reception intensity set in advance (e.g., step S23 in FIG. 11), when it is judged that the reception intensity of the radio wave is larger than the reception intensity set in advance, transmits a response radio wave corresponding to the received radio wave to the first information processing apparatus at a third transmission intensity (e.g., step S24 in FIG. 11), lowers a transmission intensity of a radio wave to be transmitted to a fourth transmission intensity that is a required minimum transmission intensity receivable by the first information processing apparatus (e.g., step S26 in FIG. 11), and executes authentication processing with the first information processing apparatus using a radio wave of the fourth transmission intensity (e.g., step S27 in FIG. 12).

This communication system can be arranged such that at least one of the first information processing apparatus and the second information processing apparatus includes an operation input unit (e.g., an authentication button 51 in FIG. 3) that is operated by a user when authentication processing is performed, judges whether authentication processing is performed on the basis of operation information inputted by the operation input unit (e.g., step S1 in FIG. 11), and when it is judged that the authentication processing is performed, judges whether the reception intensity of the received radio wave is larger than the reception intensity set in advance.

Figure 15:
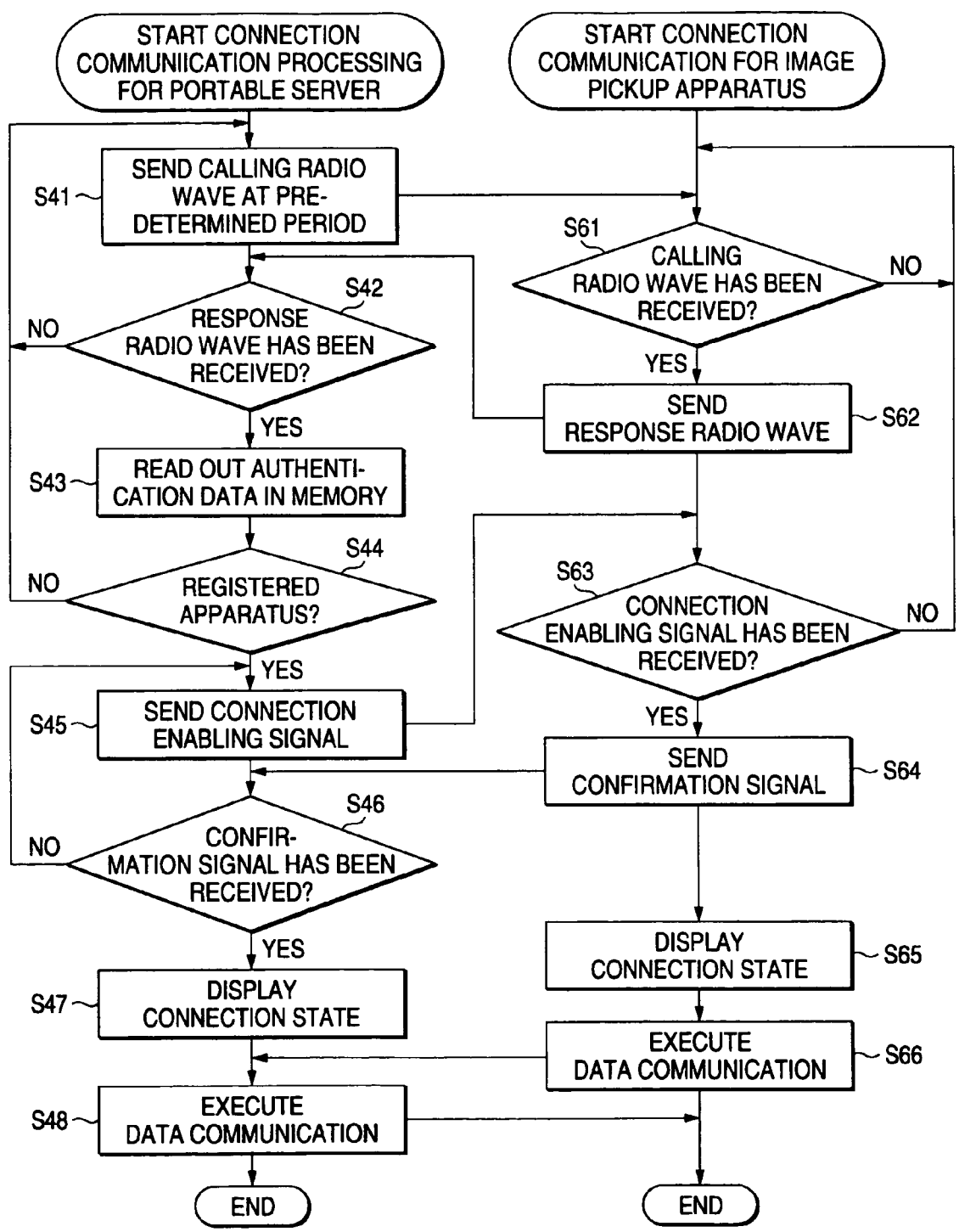
FIG. 15 is a flowchart explaining connection communication processing of the radio communication system in FIG. 1.

The communication system can be arranged such that the first information processing apparatus registers authentication data necessary for communication with the second information processing apparatus that is obtained as a result of authentication (e.g., step S7 in FIG. 12) and performs data communication with the second information processing apparatus using a radio wave of the first transmission intensity on the basis of the registered authentication data (e.g., step S48 in FIG. 15), and the second information processing apparatus registers authentication data necessary for communication with the first information processing apparatus that is obtained as a result of authentication (e.g., step S28 in FIG. 12) and performs data communication with the first information processing apparatus using a radio wave of the third transmission intensity on the basis of the registered authentication data (e.g., step S66 in FIG. 15).

According the invention, an information processing apparatus is provided. This information processing apparatus (e.g., the portable server 1 in FIG. 1) is characterized by including: a radio transmission unit (e.g., a radio transmission unit 42 in FIG. 3) that transmits a radio wave of a predetermined first transmission intensity to another information processing apparatus (e.g., the image pickup apparatus 2 in FIG. 1); a radio reception unit (e.g., a radio reception unit 41 in FIG. 3) that receives a radio wave from the other information processing apparatus; a radio wave intensity judging unit (e.g., a reception intensity measuring unit 62 in FIG. 4) that judges whether a reception intensity of the radio wave received by the radio reception unit is larger than a reception intensity set in advance; a radio wave intensity setting unit (e.g., a transmission intensity changing unit 63 in FIG. 4) that, when it is judged by the radio wave intensity judging unit that the reception intensity of the radio wave is larger than the reception intensity set in advance, lowers a transmission intensity of a radio wave to be transmitted by the radio wave transmission unit to a second transmission intensity that is a required minimum transmission intensity receivable by the other information processing apparatus; and an authentication execution unit (e.g., an authentication processing unit 64 in FIG. 4) that executes authentication processing with the other information processing apparatus using a radio wave of the second transmission intensity lowered by the radio wave intensity setting unit.

This information processing apparatus can be arranged to further include: an operation input unit (e.g., the authentication button 51 in FIG. 3) that is operated by a user when authentication processing is performed; and an authentication judging unit (e.g., a connection control unit 61 in FIG. 4 that executes processing of step S1 in FIG. 11) that judges whether authentication processing by the authentication execution unit is performed on the basis of operation information inputted by the operation input unit, wherein, when it is judged by the authentication judging unit that the authentication processing is performed, the radio wave intensity judging unit judges whether the reception intensity of the radio wave received by the radio reception unit is larger than the reception intensity set in advance.

The information processing apparatus can be arranged to further include: a registration unit (e.g., an authentication data registering unit 65 in FIG. 4) that, after the authentication processing by the authentication execution unit is executed, registers authentication data necessary for communication with the other information processing apparatus, which is obtained as a result of authentication by the authentication execution unit; and a data communication unit (e.g., a data communication unit 67 in FIG. 4) that performs data communication with the other information processing apparatus using a radio wave of the first transmission intensity on the basis of the authentication data registered by the registration unit.

This information processing apparatus (e.g., the portable server 1 in FIG. 1) can be arranged to further include: an information transmission unit (e.g., the radio transmission unit 42 in FIG. 3 that executes processing of step S41 in FIG. 15) that transmits calling information for confirming apparatuses present in a range, in which a radio wave of the first transmission intensity is receivable, using the radio wave of the first transmission intensity; an information reception unit (e.g., the radio reception unit 41 in FIG. 3 that executes processing of step S42 in FIG. 15) that receives response information from the other information processing apparatus that receives the calling information transmitted by the information transmission unit; and an authenticated apparatus judging unit (e.g., the connection control unit 61 in FIG. 4 that executes processing of step S44 in FIG. 15) that judges whether the other information processing apparatus is an authenticated apparatus on the basis of the response information received by the information reception unit and the authentication data registered by the registration unit, wherein, when it is judged by the authenticated apparatus judging unit that the other information processing apparatus is an authenticated apparatus, the data communication unit performs data communication with the other information processing apparatus using the radio wave of the first transmission intensity.

This information processing apparatus (e.g., the image pickup apparatus 2 in FIG. 1) can be arranged to further include: an information reception unit (e.g., a radio reception unit 151 in FIG. 7 that executes processing of step S61 in FIG. 15) that receives calling information for confirming apparatuses present in a range of a receivable distance of the other information processing unit from the other information processing unit; an information transmission unit (e.g., the radio transmission unit 152 in FIG. 7 that excutes processing of step S62 in FIG. 15) that transmits response information responding to the calling information received by the information reception unit using a radio wave of the first transmission intensity on the basis of the authentication data registered in the registration unit; and a connection permission judging unit (e.g., the connection control unit 61 in FIG. 4 that executes processing of step S63 in FIG. 15) that judges whether a connection permission signal is received from the other information processing apparatus in response to the response information transmitted by the information transmission unit, wherein, when it is judged by the connection permission judging unit that the connection permission signal is received from the other information processing apparatus, the data communication unit performs data communication with the other information processing apparatus using the radio wave of the first transmission intensity.

According to the invention, an information processing method is provided. This information processing method is characterized by including: a radio transmission step (e.g., step S2 in FIG. 11) of transmitting a radio wave of a predetermined first transmission intensity to an information processing apparatus; a radio reception step (e.g., step S3 in FIG. 11) of receiving a radio wave from the information processing apparatus; a radio wave intensity judgment step (e.g., step S4 in FIG. 11) of judging whether a reception intensity of the radio wave received by processing of the radio reception step is larger than a reception intensity set in advance; a radio wave intensity setting step (e.g., step S5 in FIG. 11) of, when it is judged by processing of the radio wave intensity judgment step that the reception intensity of the radio wave is larger than the reception intensity set in advance, lowering a transmission intensity of a radio wave to be transmitted to a second transmission intensity that is a required minimum transmission intensity receivable by the information processing apparatus; and an authentication execution step (e.g., step S6 in FIG. 12) of executing authentication processing with the information processing apparatus using a radio wave of the second transmission intensity lowered by processing of the radio wave intensity setting step.

Note that, since the recording medium and the program of the invention have basically the same structure as the information processing method of the invention described above, an explanation of the recording medium and the program will be omitted to avoid repetition.

Embodiments of the invention will be hereinafter explained with reference to the accompanying drawings.

FIG. 1 shows an example of a structure of a radio communication system to which the invention is applied. In FIG. 1, a portable server 1, an image pickup apparatus 2, and a portable viewer 3 are portable devices and are connected to each other by radio.

The portable server 1 is, for example, an information processing apparatus that is a portable and wireless version of a home server centrally managing video data and the like in a user's home. The portable server 1 has a main storage function for the image pickup apparatus 2 and the portable viewer 3. In other words, the portable server 1 stores image data from the image pickup apparatus 2 and causes the portable viewer 3 to read out the stored video data. Note that, although voice data is processed in the same manner actually, the processing is not shown in the example in FIG. 1.

The image pickup apparatus 2 includes a cam-coder or the like, photographs a subject in response to an operation by a user, encodes photographed and inputted video data (moving image data, still image data) into the MPEG (Moving Picture Experts Group) 2, and transmits the encoded video data to the portable server 1. In other words, it can be said that the portable server 1 and the image pickup apparatus 2 are obtained by physically dividing a photographing unit and a storage unit of one cam-coder into two apparatuses and connecting the apparatuses by radio. The portable viewer 3 is a portable display apparatus. The portable viewer 3 reproduces video data stored in the portable server 1 and displays a reproduced video in a display incorporated therein.

In this radio communication system, the portable server 1, the image pickup apparatus 2, and the portable viewer 3 are connected by radio. Moreover, in order to prevent an impertinent third party from making connection from the viewpoint of security management and copyright protection, in the respective apparatuses, transmission intensities of radio waves are set substantially the same, and when a reception intensity of a received radio wave is larger than a threshold value set in advance, authentication processing is executed. In other words, in the portable server 1, the image pickup apparatus 2, and the portable viewer 3, since transmission intensities of radio waves to be transmitted are standardized and substantially the same, two apparatuses (e.g., the portable server 1 and the image pickup apparatus 2) communicating with each other are required to be closer to each other than a specific distance in order to make a reception intensity larger than the threshold value.

Therefore, in this case, a reception intensity, at which the specific distance is several millimeters to several centimeters, is set as the threshold value, whereby authentication processing is executed only when the portable server 1 and the image pickup apparatus 2 are brought into contact with each other or into a state close to the contact (i.e., into a range closer than several millimeters to several centimeters). Moreover, at the time of authentication, a transmission intensity at the time of transmission is lowered such that a radio wave is not intercepted in locations other than a location between the portable server 1 and the image pickup apparatus 2. Then, a radio wave with the lowered transmission intensity is used, and the authentication processing is executed, whereby mutual authentication between the portable server 1 and the image pickup apparatus 2 is established.

The processing as described above is also executed between the portable server 1 and the portable viewer 3 as well as between the image pickup apparatus 2 and the portable viewer 3, and mutual authentication is performed among the respective apparatuses of the radio communication system. Consequently, thereafter, in the portable server 1, the image pickup apparatus 2, and the portable viewer 3, communication of data among the respective apparatuses is made possible.

Figure 2:
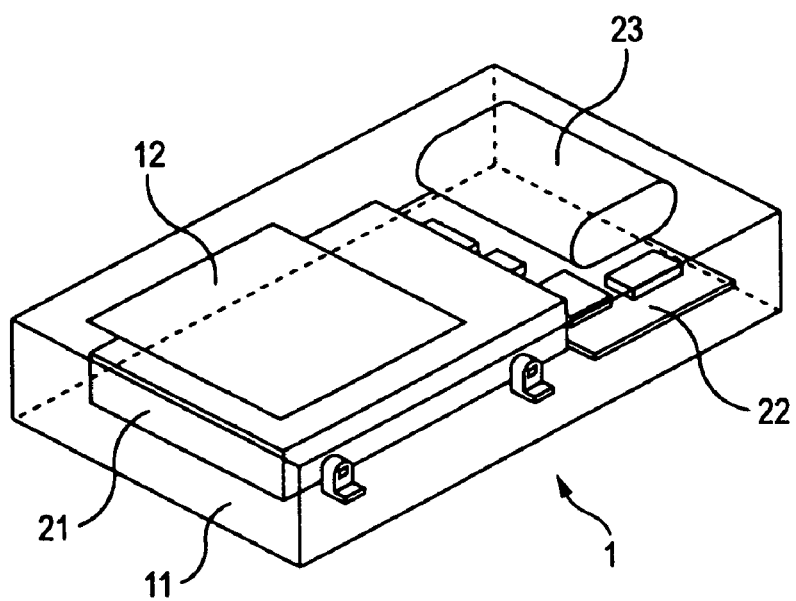
FIG. 2 is a perspective view showing an example of an exterior structure of a portable server in FIG. 1.

FIG. 2 shows an example of an exterior structure of the portable server 1 in FIG. 1. Note that, in FIG. 2, a housing 11 of the portable server 1 is made transparent to show a part of an interior structure of the housing 11.

An antenna 12, which is used in performing authentication or radio communication with another apparatus, is provided on an upper surface of the housing 11 of the portable server 1. Note that, although the antenna 12 is provided on the upper surface of the housing 11 in the example in FIG. 2, the antenna 12 only has to be provided near the surface of the housing 11 such that the antenna 12 can be close to or come into contact with antennas of the other apparatuses at the time of authentication. Alternatively, the antenna 12 may be arranged on the back of the upper surface.

In the inside of the housing 11, a hard disk drive 21, which consists of a high-speed and high-capacity random access memory or the like, and a circuit unit 22, which includes a communication control unit 33 and a radio communication unit 34 (which are described later with reference to FIG. 3), are provided on a lower surface of the housing 11. Moreover, a battery 23, which supplies electric power to respective units of the portable server 1, is provided above the circuit unit 22.

Figure 3:
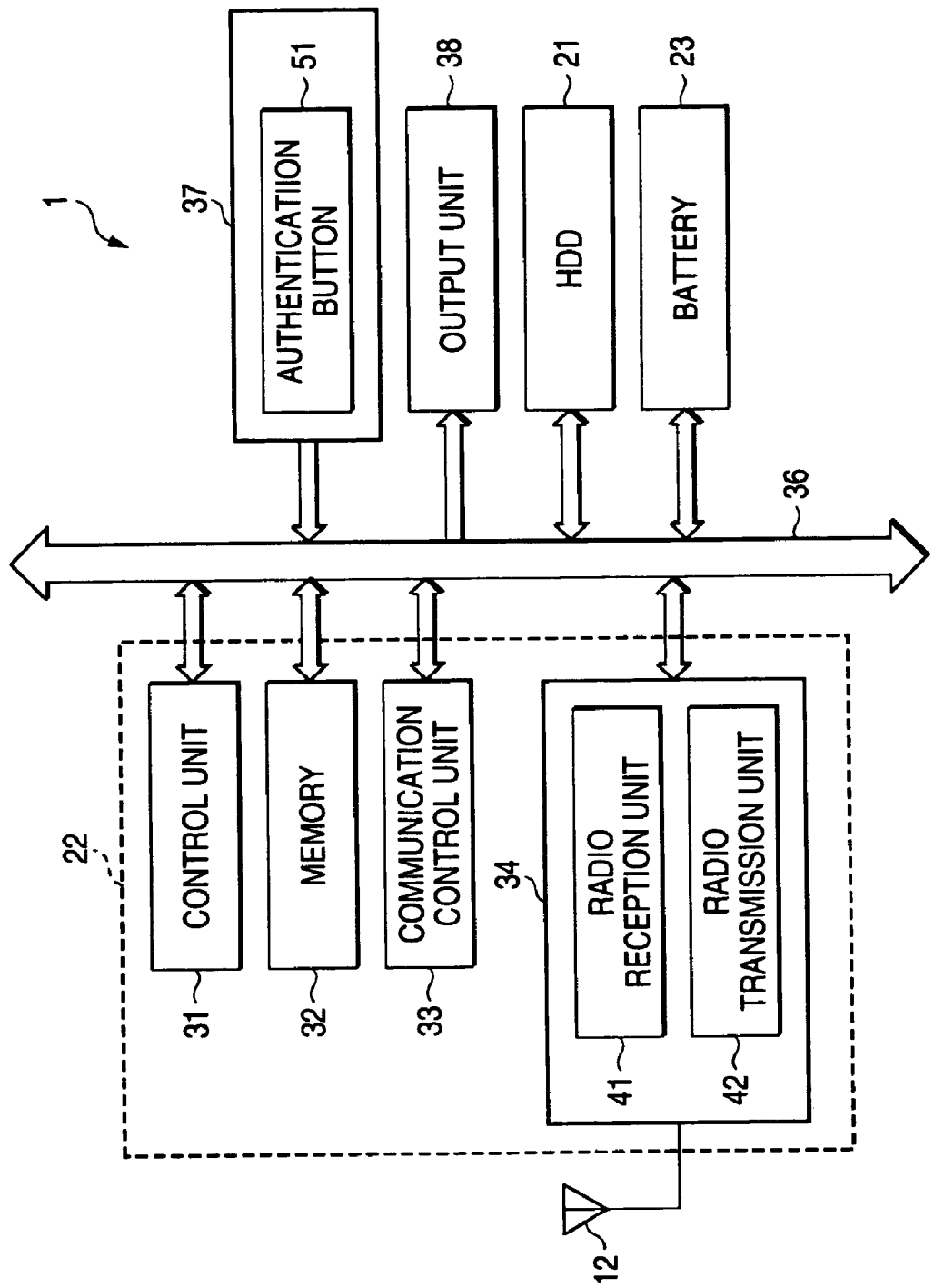
FIG. 3 is a block diagram showing an example of an interior structure of the portable server in FIG. 1.

FIG. 3 shows an example of an interior structure of the portable server 1. Note that, in FIG. 3, units corresponding to those in FIG. 2 are denoted by the corresponding reference numerals. An explanation of the units will be omitted to avoid repetition. In the example in FIG. 3, the circuit unit 22 includes a control unit 31, a memory 32, the communication control unit 33, and the radio communication unit 34.

The control unit 31 controls the respective units of the portable server 1 on the basis of an instruction signal from an operation input unit 37 in response to an operation by a user or a control signal from another apparatus to be received via the radio communication unit 34. The memory 32 is constituted by a nonvolatile memory. Authentication data of another apparatus (e.g., the image pickup apparatus 2) is registered in the memory 32 by the control unit 33. The authentication data includes data, which is necessary at the time of authentication and data communication after the authentication, such as a product ID (Identify) and encryption key data.

The communication control unit 33 measures an intensity of a reception radio wave to be received by the radio communication unit 34 (the radio reception unit 41), sets a transmission intensity of a radio wave to be transmitted from the radio communication unit 34 (the radio transmission unit 42), executes authentication processing with another apparatus via the radio communication unit 34, and registers authentication data of the other apparatus obtained by the authentication in the memory 32. In addition, the communication control unit 33 executes communication processing for video data or the like with the authenticated another apparatus via the radio communication unit 34.

The radio communication unit 34 includes the radio reception unit 41, which receives a radio wave from another apparatus via the antenna 12, and the radio transmission unit 42, which transmits a radio wave to the other apparatus via the antenna 12. A range, in which communication is receivable by the radio communication unit 34, is set to a distance of several meters to several tens meters from the antenna 12, and a transmission speed is set to Mpbs or more. More specifically, the radio communication unit 34 is constituted by the IEEE802. 11b or 11g, which is a radio LAN (Local Area Network) standard, or the UWB (Ultra Wide Band), or the like. In addition, as a transmission intensity of a radio wave transmitted from the radio transmission unit 42, a standardized transmission intensity is used like those for the image pickup apparatus 2 and the portable viewer 3. A radio wave of the standardized transmission intensity is transmitted except a radio wave for authentication processing.

The control unit 31, the memory 32, the communication control unit 33, and the radio communication unit 34 are connected to each other via a bus 36. The operation input unit 37, an output unit 38, the hard disk drive (HDD) 21, and the battery 23 are also connected to the bus 36.

The operation input unit 37 consists of various buttons, switches, and the like. The various buttons include the authentication button 51 for making it impossible to perform authentication in the portable server 1 unless a user operates the authentication button 51 intentionally. This authentication button 51 may be set to be turned ON when the user operates the authentication button 51 once. However, security in performing authentication is improved by setting the authentication button 51 to be turned ON when the user operates the authentication button 51 twice or more. For example, the authentication button 51 is constituted by a rotary switch with lock, which is represented by a recording switch like a camcoder, such that the authentication button 51 is not turned ON unless the user unlocks the rotary switch with a first operation and turns the rotary switch with a second operation. Alternatively, the authentication button 51 may be constituted by a cover switch that is uncovered by a first operation and turned ON by a second operation. The output unit 38 includes an indicator for displaying an authentication state and a connection state of another apparatus.

Figure 4:
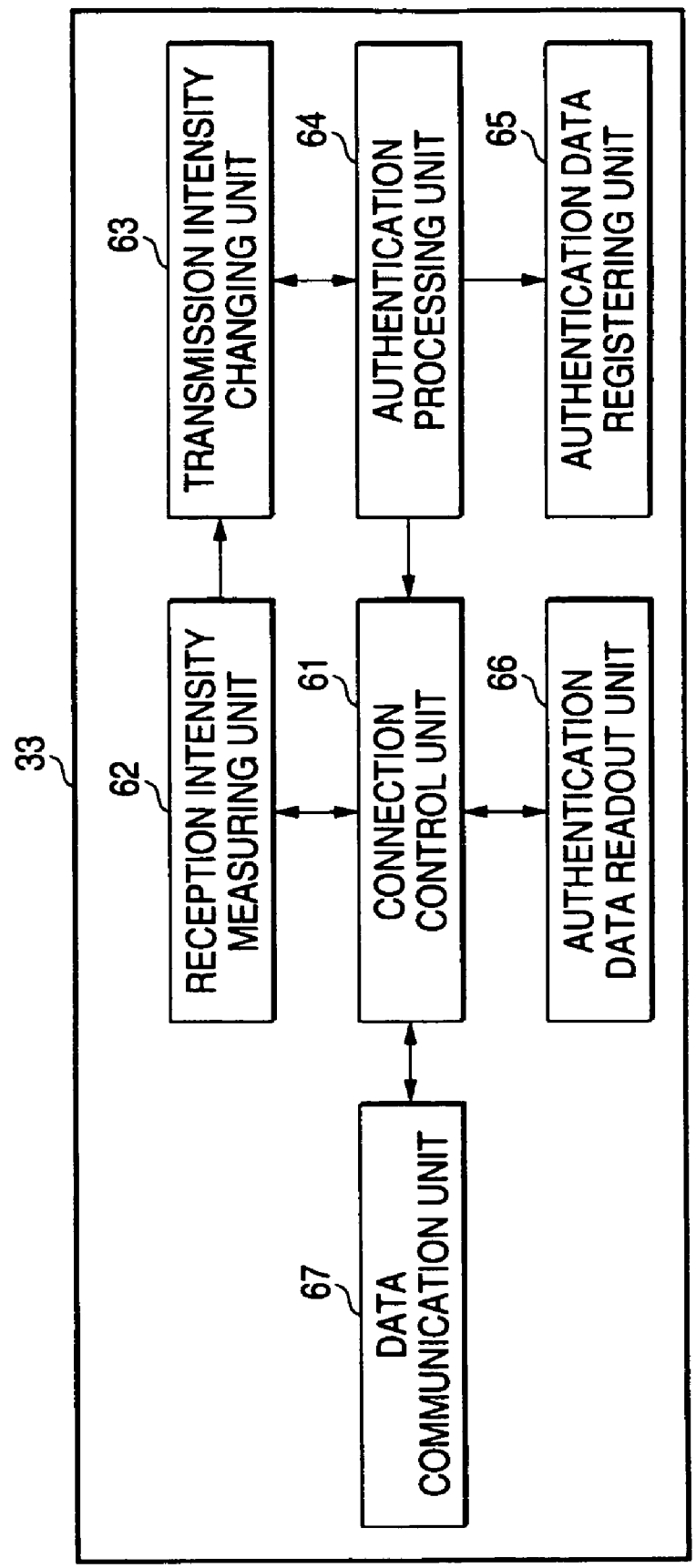
FIG. 4 is a block diagram showing an example of a detailed structure of a communication control unit in FIG. 3.

FIG. 4 shows an example of a detailed structure of the communication control unit 33. In the example in FIG. 4, the communication control unit 33 includes a connection control unit 61, a reception intensity measuring unit 62, a transmission intensity changing unit 63, an authentication processing unit 64, an authentication data registering unit 65, an authentication data readout unit 66, and a data communication unit 67.

Based on an operation of the authentication button 51 by the user, the connection control unit 61 controls the radio transmission unit 42 to transmit a calling radio wave for authentication and controls the reception intensity measuring unit 62 to measure a reception intensity of a radio wave received by the radio reception unit 41.

The connection control unit 61 controls the radio transmission unit 42 at a predetermined period to transmit a calling radio wave for confirming presence of another apparatus at a defined transmission intensity. When a response radio wave from the other apparatus corresponding to this calling radio wave is received by the radio reception unit 41, the connection control unit 61 controls the authentication data readout unit 66 to read out the authentication data from the memory 32 and executes connection processing (transmission and reception processing of a connection permission signal and a response signal corresponding thereto) with the other apparatus, which has received the calling radio wave, via the radio reception unit 41 and the radio transmission unit 42 on the basis of the read-out authentication data. Moreover, after the connection processing is executed, the connection control unit 61 causes an indicator of the output unit 38 to display a connection state with the other apparatus and controls the data communication unit 67 to execute data communication processing with the other apparatus for which the connection processing has ended.

The reception intensity measuring unit 62 measures a reception intensity of the radio wave received by the radio reception unit 41 under the control of the connection control unit 61 and judges whether the reception intensity of the received radio wave is larger than a threshold value (reception intensity) set in advance. When it is judged that the reception intensity of the received radio wave is larger than the reception intensity set in advance, the reception intensity measuring unit 62 controls the transmission intensity changing unit 63 to lower a transmission intensity of a radio wave to be transmitted from the radio wave transmission unit 42. This threshold value is set so as to be a reception intensity in the case in which a radio wave of a transmission intensity standardized in this radio communication system is received in a range of several millimeters to several centimeters. In other words, it is judged that the reception intensity of the radio wave received by the radio reception unit 41 is larger than this set threshold value only when an antenna of the other apparatus is in contact with or very close to the antenna 12.

The transmission intensity changing unit 63 lowers a transmission intensity of a radio wave to be transmitted from the radio transmission unit 42 under the control of the reception intensity measuring unit 62. In other words, the transmission intensity changing unit 63 lowers the transmission intensity standardized in this radio communication system to a required minimum transmission intensity that the antenna of the other apparatus, which is in contact with or is very close to the antenna 12, can receive. When the authentication processing by the authentication processing unit 64 ends, the transmission intensity changing unit 63 returns the transmission intensity of the radio wave to be transmitted from the radio wave transmission unit 42 to the original intensity (i.e., the standardized transmission intensity).

When the transmission intensity of the radio wave to be transmitted from the radio transmission unit 42 is lowered by the transmission intensity changing unit 63, the authentication processing unit 64 executes authentication processing with the other apparatus via the radio reception unit 41 and the radio transmission unit 42. The authentication processing unit 64 sends a radio wave for authentication, a transmission intensity of which is lower by the transmission intensity changing unit 63, to the other apparatus via the radio transmission unit 42 and receives a response radio wave corresponding to the radio wave for authentication from the other apparatus via the radio reception unit 41. In addition, the authentication processing unit 64 transmits and receives authentication data (product ID (Identify), encryption key) necessary for authentication or data communication after the authentication to and from the other apparatus using the radio wave for authentication via the antenna 12 and the radio communication unit 34 or generates the authentication data. Then, the authentication processing unit 64 outputs the authentication data to the authentication data registering unit 65.

When the authentication data is inputted from the authentication processing unit 64, the authentication data registering unit 65 registers the authentication data in the memory 32. The authentication data readout unit 66 reads out the authentication data from the memory 32 under the control of the connection control unit 61 and outputs the read-out authentication data to the connection control unit 61. The data communication unit 67 executes data communication with the other apparatus, which is permitted to make connection, under the control of the connection control unit 61.

Figure 5:
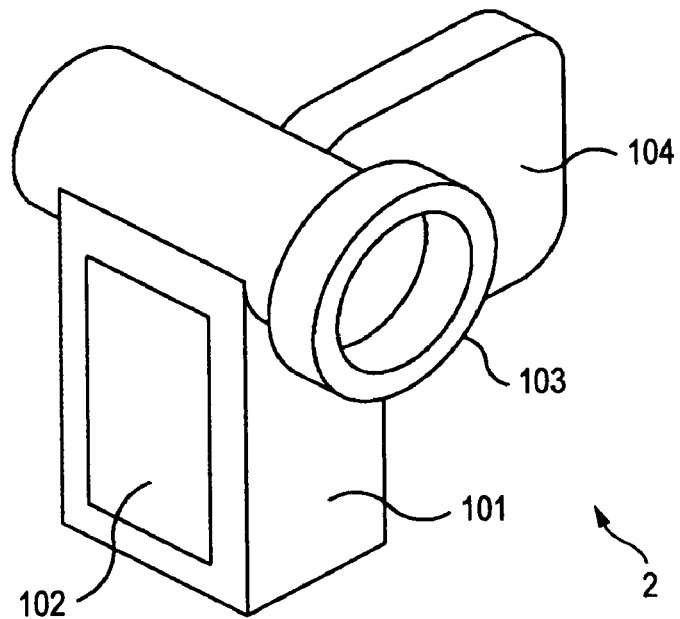
FIG. 5 is a perspective view showing an example of an exterior structure of an image pickup apparatus in FIG. 1.

FIG. 5 shows an example of an exterior structure of the image pickup apparatus 2 in FIG. 1. In the example in FIG. 5, the image pickup apparatus 2 includes a housing 101, an antenna 102, a camera unit 103, and a display unit 104.

The antenna 102 has the same structure as the antenna 12 in FIG. 2 and is provided on a side of the housing 101. Note that, although the antenna 102 is provided on the outer side of the housing 101, the antenna 102 only has to be provided near a surface of the housing 101 such that, for example, the antenna 102 can be close to or in contact with the antenna 12 of the portable server 1 at the time of authentication. The antenna 102 may be arranged on an inner side of the housing 101.

The camera unit 103 includes a lens and a CCD (Charge-Coupled Devices) image pickup element for picking up images of a subject and is provided in a front upper part in the figure of the housing 101. The display unit 104 is connected to the housing 101 by a not shown hinge or the like on a side of the housing 101 opposite to the antenna 102 to open and close freely such that the display unit 104 can be opened at the time of photographing and folded and closed to fit the housing 101 at the time of storage.

Figure 6:
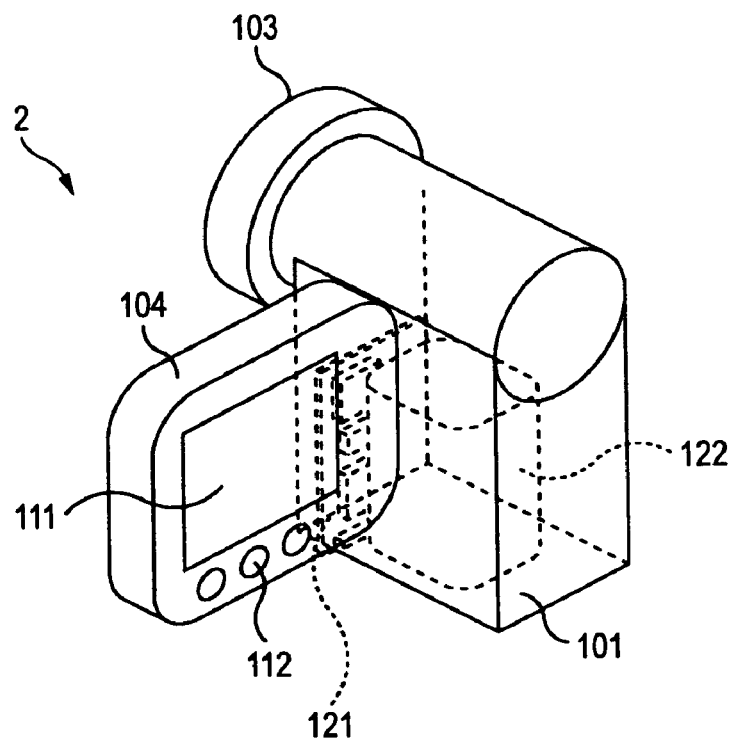
FIG. 6 is a perspective view showing an example of an exterior structure of the image pickup apparatus in FIG. 5 viewed from an opposite direction.

FIG. 6 shows an example of an exterior structure in the case in which the image pickup apparatus 2 in FIG. 5 is viewed from the opposite direction. Note that, in FIG. 6, a part of an interior structure of the housing 101 of the image pickup apparatus 2 is indicated by a dotted line.

In the example in FIG. 6, a display 111, which displays a video being photographed, a state of authentication and a state of connection with another apparatus, or status information of the portable server 1 (a recording state, a standby state, or a reproduction state), is arranged in the display unit 104. In the display unit 104, control buttons 112, which a user uses to instruct predetermined processing of the image pickup apparatus 2, are arranged below the display 111.

A circuit unit 121, which includes a control unit 141, a communication control unit 144, and a radio communication unit 145 (which are described later with reference to FIG. 7), is provided on a surface on the camera unit 103 side inside the housing 101. A battery 122, which supplies electric power to the respective units of the image pickup apparatus 2, is provided in the center inside the housing 101.

Figure 7:
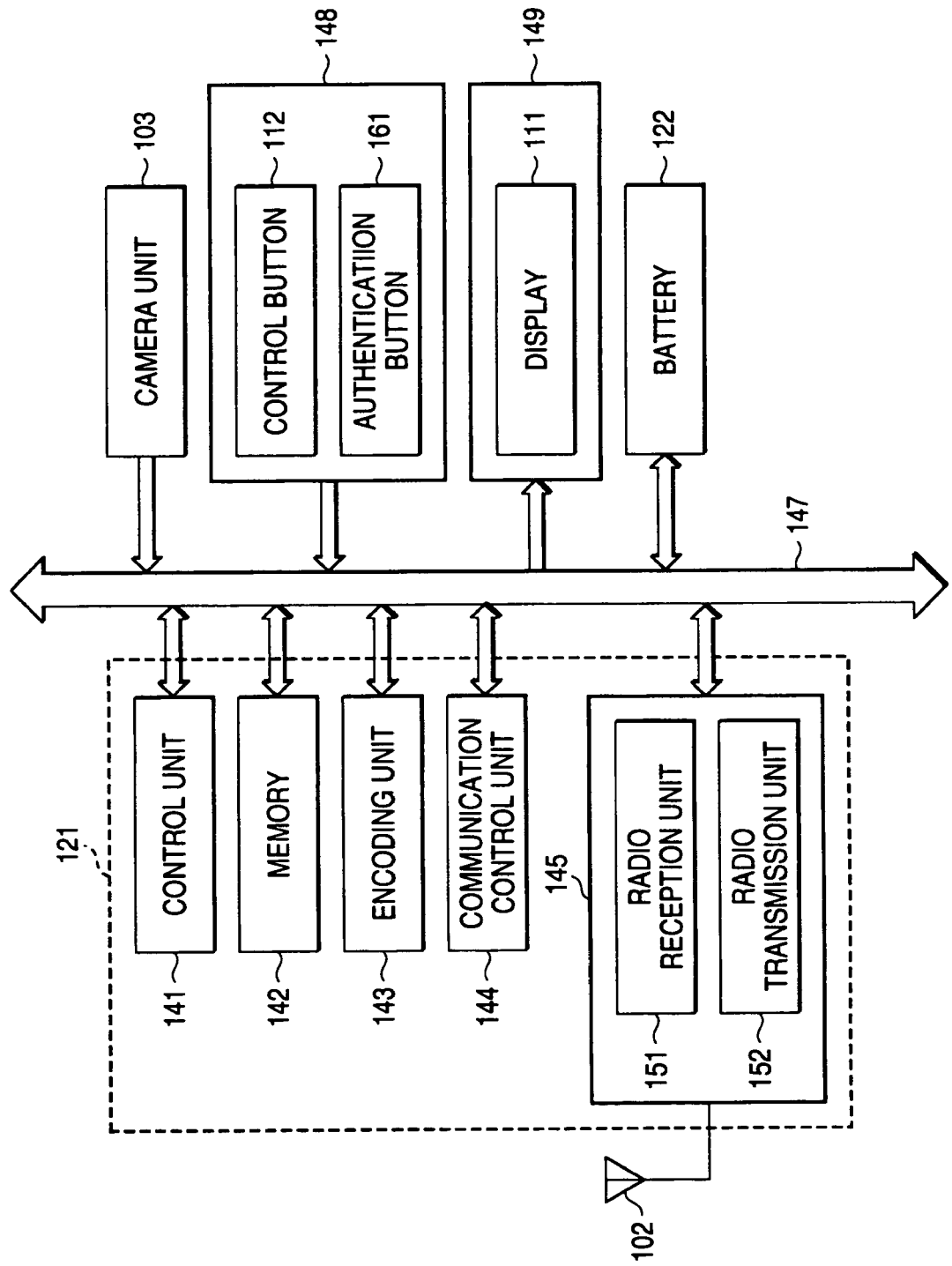
FIG. 7 is a block diagram showing an example of an interior structure of the image pickup apparatus in FIG. 1.

FIG. 7 shows an example of an interior structure of the image pickup apparatus 2. Note that, in FIG. 7, units corresponding to those in FIG. 6 are denoted by the corresponding reference numerals. An explanation of the units will be omitted to avoid repetition. In the example in FIG. 7, the circuit unit 121 includes a control unit 141, a memory 142, an encoding unit 143, a communication control unit 144, and a radio communication unit 145.

The control unit 141 controls the respective units of the image pickup apparatus 2 on the basis of an instruction signal from an operation input unit 148 in response to an operation by a user. In addition, the control unit 141 also controls the respective units of the portable server 1 via the radio communication unit 145 and the antenna 102. The memory 142 is constituted by a nonvolatile memory. Authentication data necessary for data communication with another apparatus (e.g., the portable server 1) is registered by the communication control unit 144. The encoding unit 143 applies encoding processing to video data inputted from the camera unit 103 using the MPEG2 or the like and outputs the encoded video data to the hard disk drive 21 of the portable server 1 via the radio communication unit 145 and the antenna 102.

The communication control unit 144 measures an intensity of a reception radio wave to be received by the radio communication unit 145 (radio reception unit 151), sets a transmission intensity of a radio wave to be transmitted from the radio communication unit 145 (radio transmission unit 152), executes authentication processing with another apparatus via the radio communication unit 145, and registers authentication data necessary for data communication with the other apparatus obtained by authentication in the memory 142. In addition, the communication control unit 144 executes communication processing for video data or the like with the authenticated another apparatus via the radio communication unit 145. The communication control unit 144 has basically the same structure as the communication control unit 33 described above with reference to FIG. 4. Therefore, in the following explanation, the structure of the communication control unit 33 in FIG. 4 is cited as the structure of the communication control unit 144 as required.

The radio communication unit 145 includes a radio reception unit 151, which receives a radio wave from another apparatus via the antenna 102, and a radio transmission unit 152, which transmits a radio wave to the other apparatus via the antenna 102. Note that, since the radio communication unit 145 has basically the same structure as the radio communication unit 34 in FIG. 3, a detailed explanation of the radio communication unit 145 will be omitted to avoid repetition.

The control unit 141, the memory 142, the encoding unit 143, the communication control unit 144, and the radio communication unit 145 are connected to each other via a bus 147. In addition, the camera unit 103, the operation input unit 148, an output unit 149, and the battery 122 are also connected to the bus 147.

The camera unit 103 picks up an image of a subject and outputs the picked-up video data to the encoding unit 143. The operation input unit 148 includes various buttons and switches. The various buttons include the control buttons 112, which a user uses to instruct predetermined processing of the image pickup apparatus 2, and an authentication button 51 for making it impossible to perform authentication in the image pickup apparatus 2 unless the user operates the authentication button 161 intentionally. Note that, since the authentication button 161 has basically the same structure as the authentication button 51 in FIG. 3, a detailed explanation of the authentication button 161 will be omitted to avoid repetition. The output unit 149 includes the display 111 consisting of a CRT (Cathode Ray Tube), an LCD (Liquid Crystal Display), or the like and a speaker.

Figure 8:
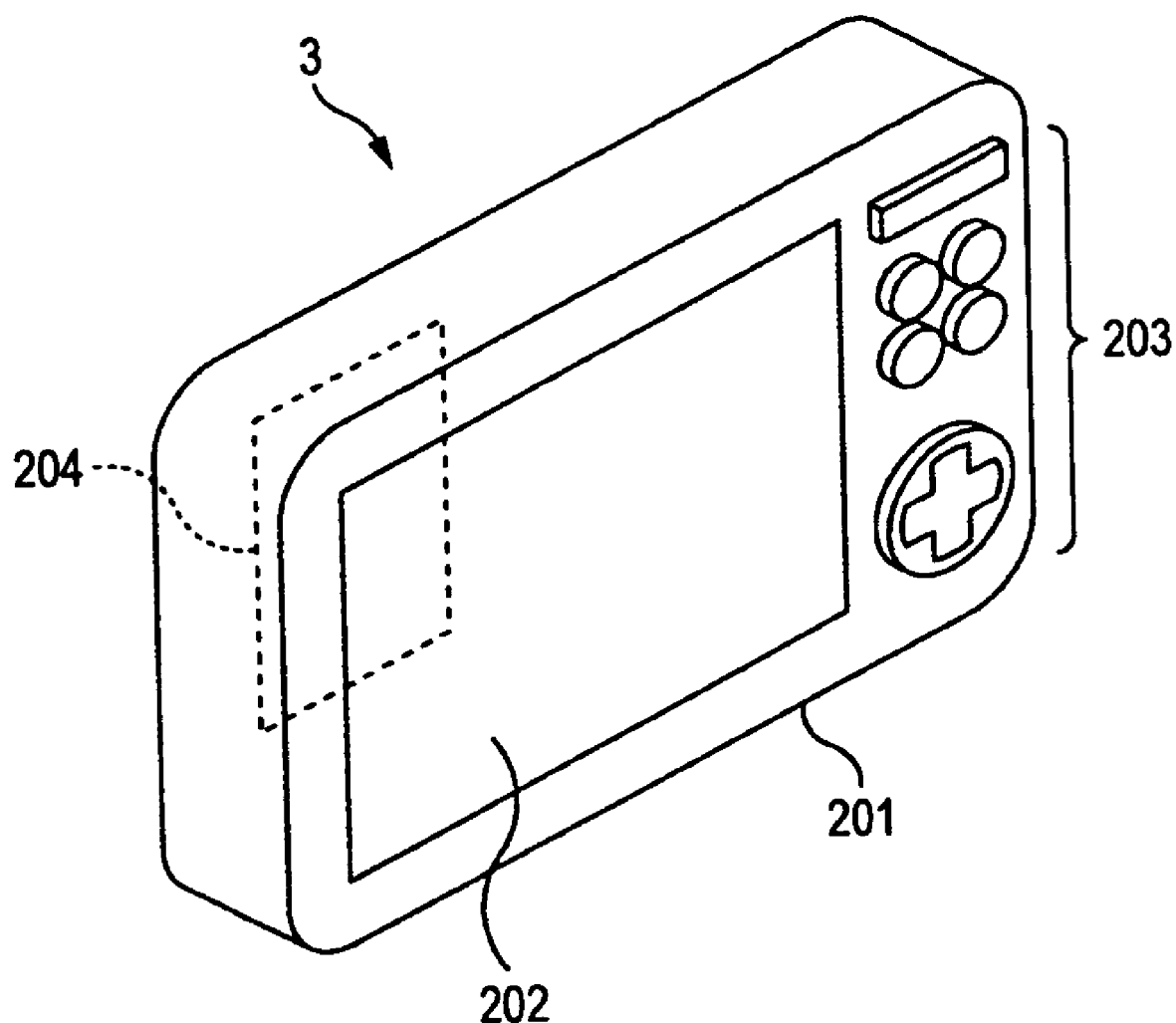
FIG. 8 is a perspective view showing an example of an exterior structure of a portable viewer in FIG. 1.

FIG. 8 shows an example of an exterior structure of the portable viewer 3 in FIG. 1. In the example in FIG. 8, the portable viewer 3 includes a housing 201, a display 202, control buttons 203, and an authentication antenna 204.

The display 202, which displays a reproduced video, a state of authentication and a state of connection with another apparatus, or status information of the portable viewer 3 and the portable server 1, is provided a front surface of the housing 201. The control buttons 203, which a user uses to instruct predetermined processing of the portable viewer 3, is provided beside the display 202.

The authentication antenna 204 has the same structure as the antenna 12 in FIG. 2 and is provided on a back surface (another surface where the display 202 is not provided) of the housing 201. Note that, although the authentication antenna 204 is provided on an outer side on the back surface of the housing 201 in the example in FIG. 8, the authentication antenna 204 only has to be provided near a surface of the housing 201 such that the authentication antenna 204 can be close to or in contact with another apparatus at the time of authentication. The authentication antenna 204 may be arranged on an inner side on the back surface of the housing 201.

Figure 9:
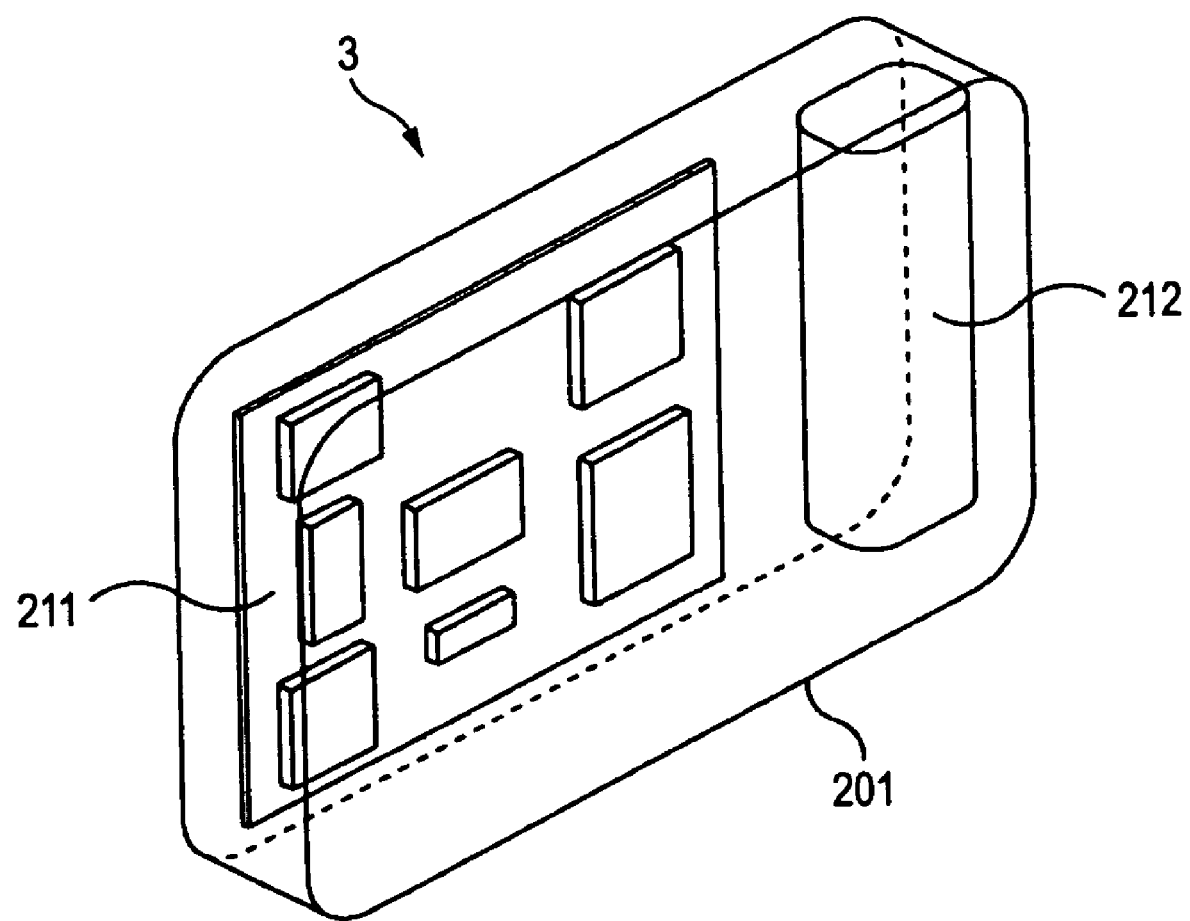
FIG. 9 is a perspective view showing an example of a transparent structure of the portable viewer in FIG. 8.

FIG. 9 shows a part of an example of a transparent interior structure of the portable viewer 3 in FIG. 8.

In the example in FIG. 9, a circuit unit 211, which includes a control unit 231, an authentication radio communication unit 234, and a radio communication unit 235 (which are described later with reference to FIG. 10), is provided in the inside of the back surface (the surface on which the authentication antenna 204 is provided) of the housing 201. A battery 212, which supplies electric power to the respective units of the portable viewer 3, is provided on the right side in the figure.

Figure 10:
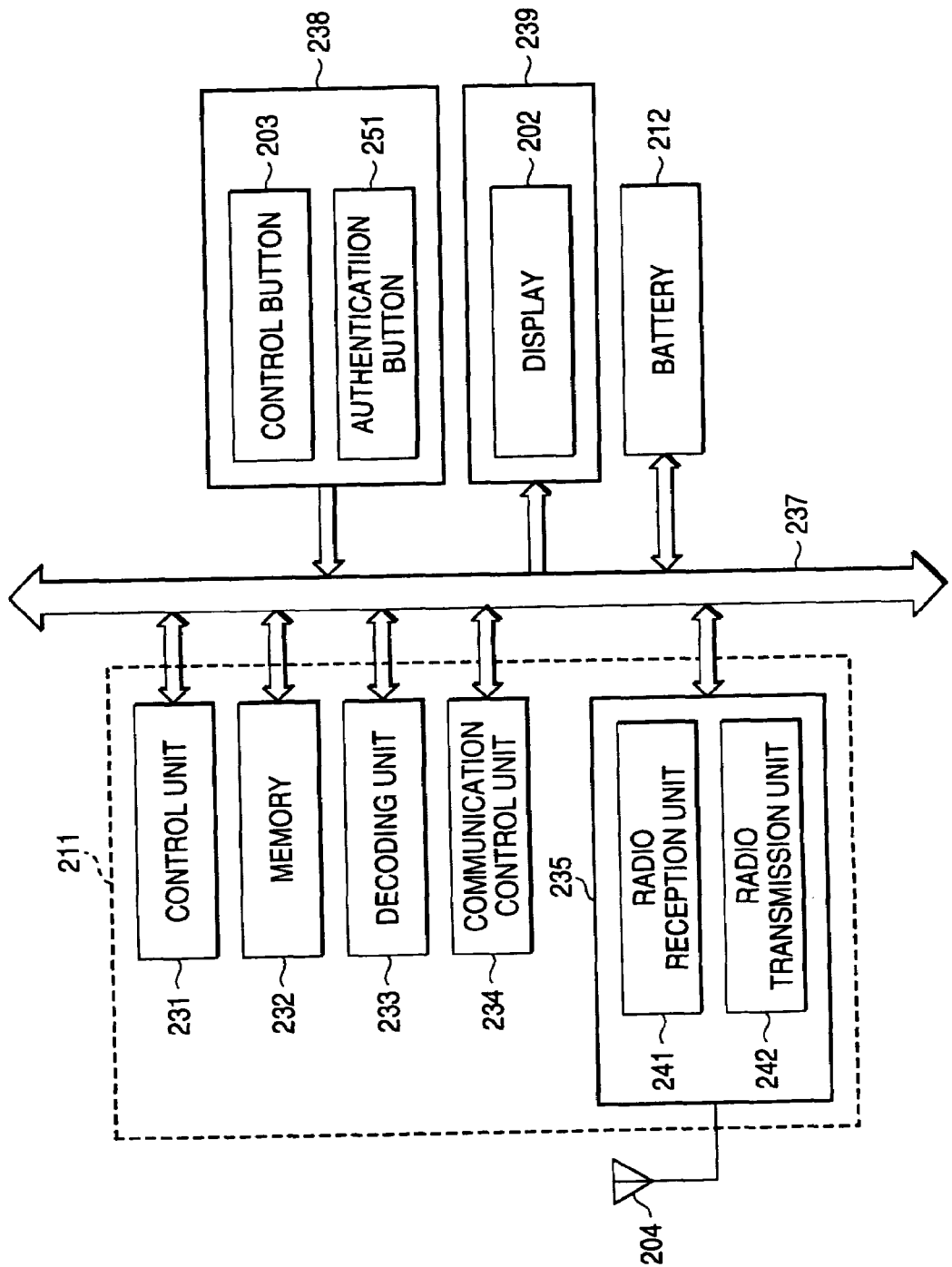
FIG. 10 is a block diagram showing an example of an interior structure of the portable viewer in FIG. 1.

FIG. 10 shows an example of an interior structure of the portable viewer 3. Note that, in FIG. 10, units corresponding to those in FIGS. 8 and 9 are denoted by the corresponding reference numerals. An explanation of the units will be omitted to avoid repetition. In the example of FIG. 10, the circuit unit 211 includes the control unit 231, a memory 232, a decoding unit 233, the communication control unit 234, and the radio communication unit 235.

The control unit 231 controls the respective units of the portable viewer 3 on the basis of an instruction signal from an operation input unit 238 in response to an operation by a user. In addition, the control unit 231 controls the respective units of the portable server 1 via the radio communication unit 235 and the antenna 204 on the basis of an instruction signal from the operation input unit 238. For example, the control unit 231 applies control for variable speed reproduction to the respective units of the portable server 1 in order to reproduce video data stored in the portable server 1 at a variable speed. The memory 232 is constituted by a nonvolatile memory. Authentication data necessary for data communication with another apparatus (e.g., portable server 1) is registered in the memory 232 by the communication control unit 234. The decoding unit 233 decodes the video data read out from the portable server 1 via the radio communication unit 235 and the antenna 204 and displays the video data on the display 202.

The communication control unit 234 measures an intensity of a reception radio wave to be received by the radio communication unit 235 (a radio reception unit 241), sets a transmission intensity of a radio wave to be transmitted from the radio communication unit 235 (a radio transmission unit 242), executes authentication processing with another apparatus via the radio communication unit 235, and registers authentication data necessary for data communication with the other apparatus obtained by authentication in the memory 232. In addition, the communication control unit 234 executes communication processing for video data or the like with the authenticated another apparatus via the radio communication unit 235. Note that the communication control unit 234 has basically the same structure as the communication control unit 33 described above with reference to FIG. 4. Therefore, in the following explanation, the structure of the communication control unit 33 in FIG. 4 is cited as the structure of the communication control unit 234 as required.

The radio communication unit 235 includes the radio reception unit 241, which receives a radio wave from another apparatus via the antenna 204, and the radio transmission unit 242, which transmits a radio wave to the other apparatus via the antenna 204. Note that, since the radio communication unit 235 has basically the same structure as the radio communication unit 34 in FIG. 3, a detailed explanation of the radio communication unit 235 will be omitted to avoid repetition.

In the example in FIG. 10, the control unit 231, the memory 232, the decoding unit 233, the communication control unit 234, and the radio communication unit 235 are connected to each other via a bus 237. In addition, the operation input unit 238, an output unit 239, and the battery 212 are also connected to the bus 237.

The operation input unit 238 includes various buttons and switches. The various buttons include the control buttons 203, which a user uses to instruct predetermined processing of the portable viewer 3, and an authentication button 251 for making it impossible to perform authentication unless the user operates the authentication button 251 intentionally. Note that, since the authentication button 251 has basically the same structure as the authentication button 51 in FIG. 3, a detailed explanation of the authentication button 251 will be omitted to avoid repetition. The output unit 239 includes the display 202 consisting of a CRT (Cathode Ray Tube), an LCD (Liquid Crystal Display), or the like and a speaker.

Next, authentication processing of the radio communication system will be explained with reference to a flowchart in FIGS. 11 and 12. Note that, in an example in FIGS. 11 and 12, authentication processing in the portable server 1 and the image pickup apparatus 2 will be explained.

In order to cause the portable server 1 to authenticate the image pickup apparatus 2, a user turns ON the authentication button 51 of the portable server 1 and also turns ON the authentication button 161 of the image pickup apparatus 2. For example, in the case in which the authentication button 51 of the portable server 1 is constituted by a cover switch or the like, the user uncovers the cover switch with a first operation and turns ON the cover switch with a second operation to turn ON the authentication button 51. In addition, for example, in the case in which the authentication button 161 of the image pickup apparatus 2 is constituted by a rotary switch with lock, the user unlocks the rotary switch with a first operation and turns the rotary switch with a second operation to turn ON the authentication button 161. Then, the user brings the image pickup apparatus 2 and the portable server 1 to positions where the antenna 12 and the antenna 102 are in contact with or very close to each other (i.e., in a range in which the antenna 12 and the antenna 102 are closer than several millimeters to several centimeters).

A range in which authentication is possible in the portable server 1 and the image pickup apparatus 2 will be explained with reference to FIGS. 13 and 14. Note that, in examples in FIGS. 13 and 14, the antenna 12 is provided near a surface (a surface on the image pickup apparatus 2 side) inside the housing 11 of the portable server 1, and the antenna 102 is provided near a surface (a surface on the portable server 1 side) inside the housing 101 of the image pickup apparatus 2.

Figure 13:
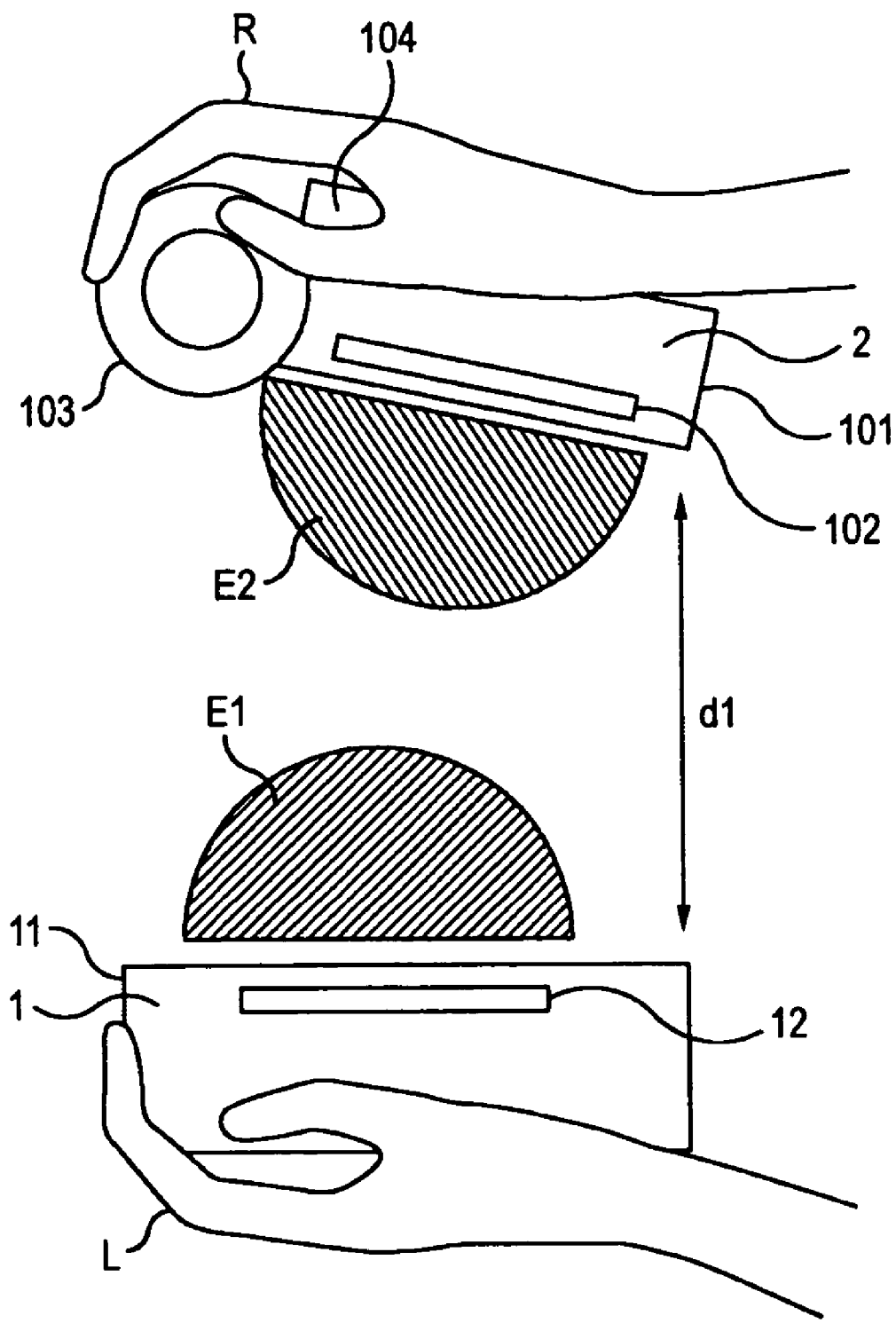
FIG. 13 is a diagram explaining a range in which the radio communication system in FIG. 1 can perform authentication.

In the case of the example in FIG. 13, a user holds the housing 11 of the portable server 1 in the left hand L with the antenna 12 facing the right hand R (image pickup apparatus 2) side and holds the housing 101 and the camera unit 103 of the image pickup apparatus 2 in the right hand R with the antenna 102 facing the left hand L (portable server 1) side. Note that the display unit 104 of the image pickup apparatus 2 is folded to the housing 101 side in a stored state.

As described above, in the reception intensity measuring unit 62 of the portable server 1 and the image pickup apparatus 2, a reception intensity (threshold value) of a radio wave at the time when authentication processing is executed is set so as to be larger than a reception intensity in the case in which a radio wave of a transmission intensity standardized in this radio communication system is received in a range of several millimeters to several centimeters from a receiving device. A range E1 is a range in which it is judged that a reception intensity of a radio wave to be received by the antenna 12 of the portable server 1 is larger than the reception intensity (threshold value) set in the portable server 1. A range E2 is a range in which it is judged that a reception intensity of a radio wave to be received by the antenna 102 of the image pickup apparatus 2 is larger than the reception intensity (threshold value) set in the image pickup apparatus 2.

However, in the case of the example in FIG. 13, a distance d1 between the portable server 1 and the image pickup apparatus 2 is longer than a distance indicated by the range E1 or the range E2. In other words, a reception intensity at the time when a radio wave from the antenna 12 of the portable server 1 is received by the antenna 102 of the image pickup apparatus 2 is smaller than the reception intensity (threshold value) set by the reception intensity measuring unit 62 of the image pickup apparatus 2. Similarly, a reception intensity at the time when a radio wave from the antenna 102 of the image pickup apparatus 2 is received by the antenna 12 of the portable server 1 is smaller than the reception intensity (threshold value) set by the reception intensity measuring unit 62 of the portable server 1. Therefore, authentication processing is not started in the portable server 1 and the image pickup apparatus 2.

Figure 14:
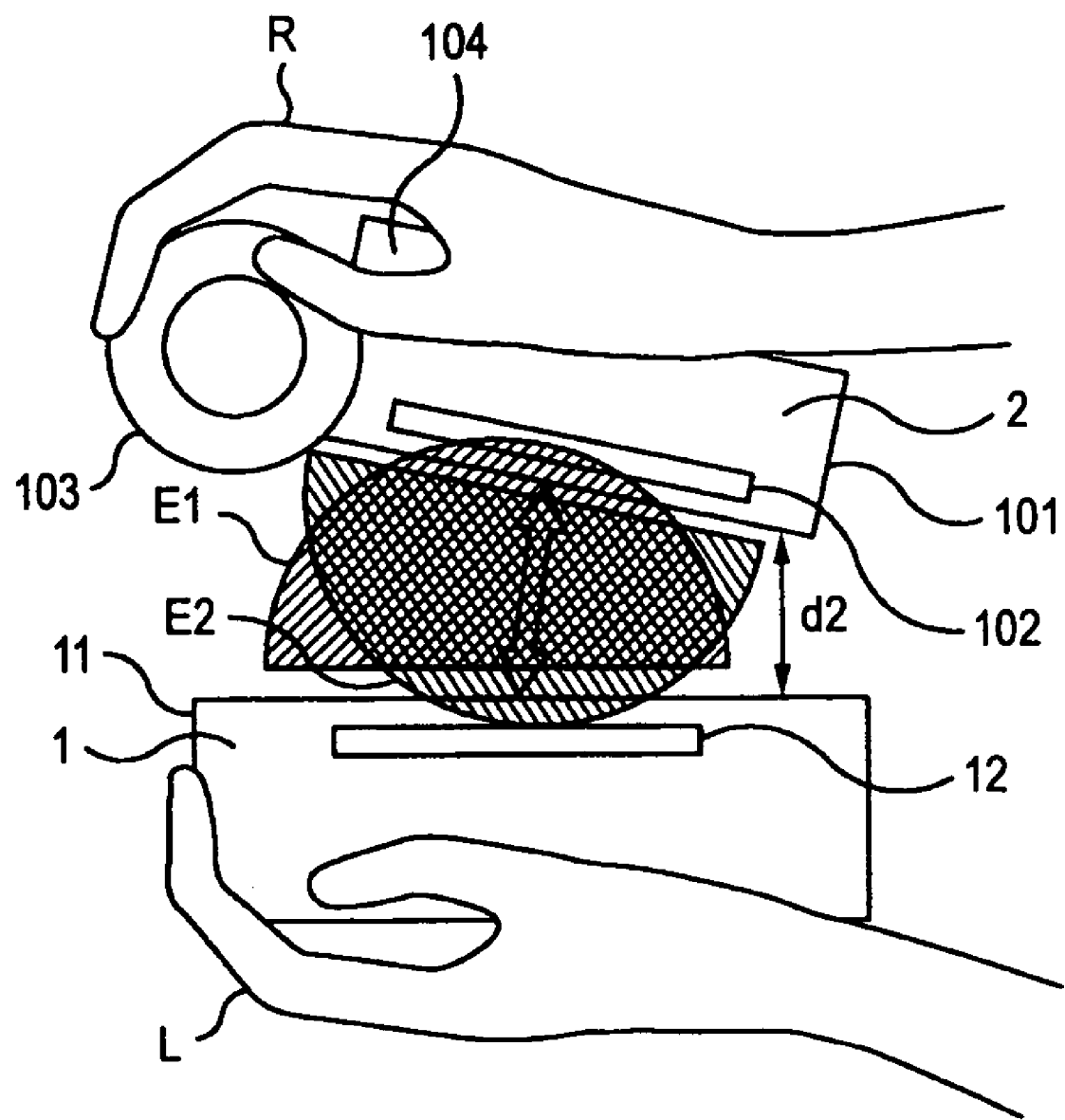
FIG. 14 is another diagram explaining a range in which the radio communication system in FIG. 1 can perform authentication.

Thus, as shown in FIG. 14, the user brings the portable server 1 and the image pickup apparatus 2 to positions where the antenna 12 of the portable server 1 and the antenna 102 of the image pickup apparatus 2 are in contact with or very close to each other.

In the example in FIG. 14, a distance d2 between the portable server 1 and the image pickup apparatus 2 is shorter than a distance indicated by the range E1 in which it is judged that a reception intensity of a radio wave to be received by the antenna 12 of the portable server 1 is larger than the reception intensity (threshold value) set in the portable server 1 and the range E2 in which it is judged that a reception intensity of a radio wave to be received by the antenna 102 of the image pickup apparatus 2 is larger than the reception intensity (threshold value) set in the image pickup apparatus 2 (i.e., several millimeters to several centimeters). Therefore, in the portable server 1, it is judged that a reception intensity of a radio wave from the image pickup apparatus 2 received in the antenna 12 is larger than the set reception intensity (threshold value). In the image pickup apparatus 2, it is also judged that a reception intensity of a radio wave from the portable server 1 received in the antenna 102 is larger than the set reception intensity (threshold value). Thus, as indicated by a thick arrow, the following communication processing is executed in the communication control unit 33 of the portable server 1 and the communication control unit 144 of the image pickup apparatus 2.

Note that, since radio waves of standardized and substantially the same transmission intensities are used in the portable server 1 and the image pickup apparatus 2, it is preferable that the range E1 and the range E2 are set to ranges of substantially the same distances (i.e., the threshold values are set substantially the same in the portable server 1 and the image pickup apparatus 2). However, the range E1 and the range E2 may indicate ranges of different distances as long as the ranges are within several millimeters to several centimeters.

Figure 11:
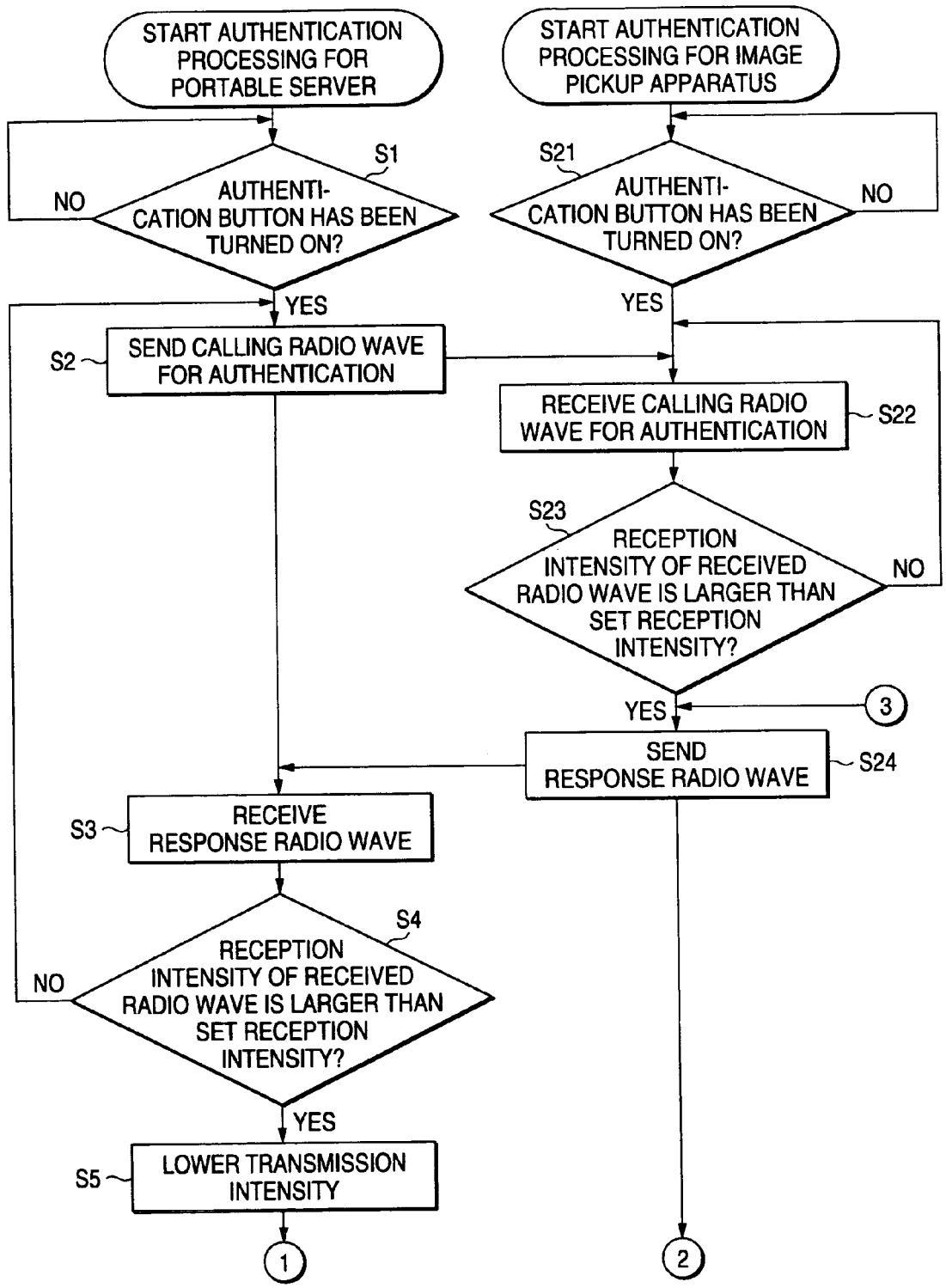
FIG. 11 is a flowchart explaining authentication processing of the radio communication system in FIG. 1.

The connection control unit 61 of the portable server 1 is on standby until the authentication button 51 is turned ON in step S1 in FIG. 11. If the authentication button 51 is turned ON and it is judged that the authentication button 51 has been turned ON, the connection control unit 61 proceeds to step S2. In step S2, the connection control unit 61 controls the radio transmission unit 42 to transmit a calling radio wave for authentication at the standardized transmission intensity via the antenna 12 at a predetermined period and proceeds to step S3. This calling radio wave is a radio wave for, in the case in which an apparatus to be authenticated is present in a range of several meters to several tens meters from the antenna 12, requesting a response radio wave in order to measure a reception intensity of a radio wave from the apparatus.

On the other hand, the connection control unit 61 of the image pickup apparatus 2 also on standby until the authentication button 161 is turned ON in step S21 in FIG. 11. If the authentication button 161 is turned ON and it is judged that the authentication button has been turned ON, the connection control unit 61 proceeds to step S22. In step S22, the radio reception unit 151 receives a calling radio wave for authentication, which is transmitted from the portable server 1 by the processing of step S2, via the antenna 102. The connection control unit 61 proceeds to step S23. In step S23, the connection control unit 61 controls the reception intensity measuring unit 62 to judge whether a reception intensity of the radio wave received by the radio reception unit 151 is larger than the reception intensity (threshold value) set in advance. If the reception intensity measuring unit 62 judges in step S23 that the reception intensity of the radio wave received by the radio reception unit 151 is smaller than the reception intensity set in advance, the connection control unit 61 returns to step S22 and repeats the processing of the step S22 and the subsequent steps.

As described above with reference to FIG. 14, the antenna 102 of the image pickup apparatus 2 is at the distance d2 from the antenna 12 of the portable server 1 within the range (E2) in which it is judged that a reception intensity of a radio wave from the antenna 12 of the portable server 1 is larger than the set reception intensity. Thus, in step S23, it is judged by the reception intensity measuring unit 62 that the reception intensity of the radio wave received by the radio reception unit 151 is larger than the reception intensity set in advance. In step S24, the connection control unit 61 controls the radio transmission unit 152 to send a response radio wave corresponding to the calling radio wave for authentication with the standardized transmission intensity via the antenna 102 and proceeds to step S25 in FIG. 12.

Since the response radio wave corresponding to the calling radio wave for authentication is transmitted from the image pickup apparatus 2, the radio reception unit 41 of the portable server 1 receives the response radio wave via the antenna 12 in step S3. The connection control unit 61 proceeds to step S4. In step S4, the connection control unit 61 controls the reception intensity measuring unit 62 to judge whether a reception intensity of the radio wave received by the radio reception unit 41 is larger than the reception intensity (threshold value) set in advance. If the reception intensity measuring unit 62 judges in step S4 that the reception intensity of the radio wave received by the radio reception unit 41 is smaller than the reception intensity set in advance, the connection control unit 61 returns to step S2 and repeats the processing of step S2 and the subsequent steps.

As described above with reference to FIG. 14, the antenna 12 of the portable server 1 is at the distance d2 from the antenna 102 of the image pickup apparatus 2 within the range (E1) in which it is judged that a reception intensity of a radio wave from the antenna 102 of the image pickup apparatus 2 is larger than the set reception intensity. Thus, in step S4, it is judged by the reception intensity measuring unit 62 that the reception intensity of the radio wave received by the radio reception unit 41 is larger than the reception intensity set in advance. The connection control unit 61 proceeds to step S5 and controls the transmission intensity changing unit 63 to lower the standardized transmission intensity to a required minimum transmission intensity that the antenna 102 of the image pickup apparatus 2, which is in contact with or very close to the antenna 12, can receive. Then, the connection control unit 61 proceeds to step S6 in FIG. 12.

Figure 12:
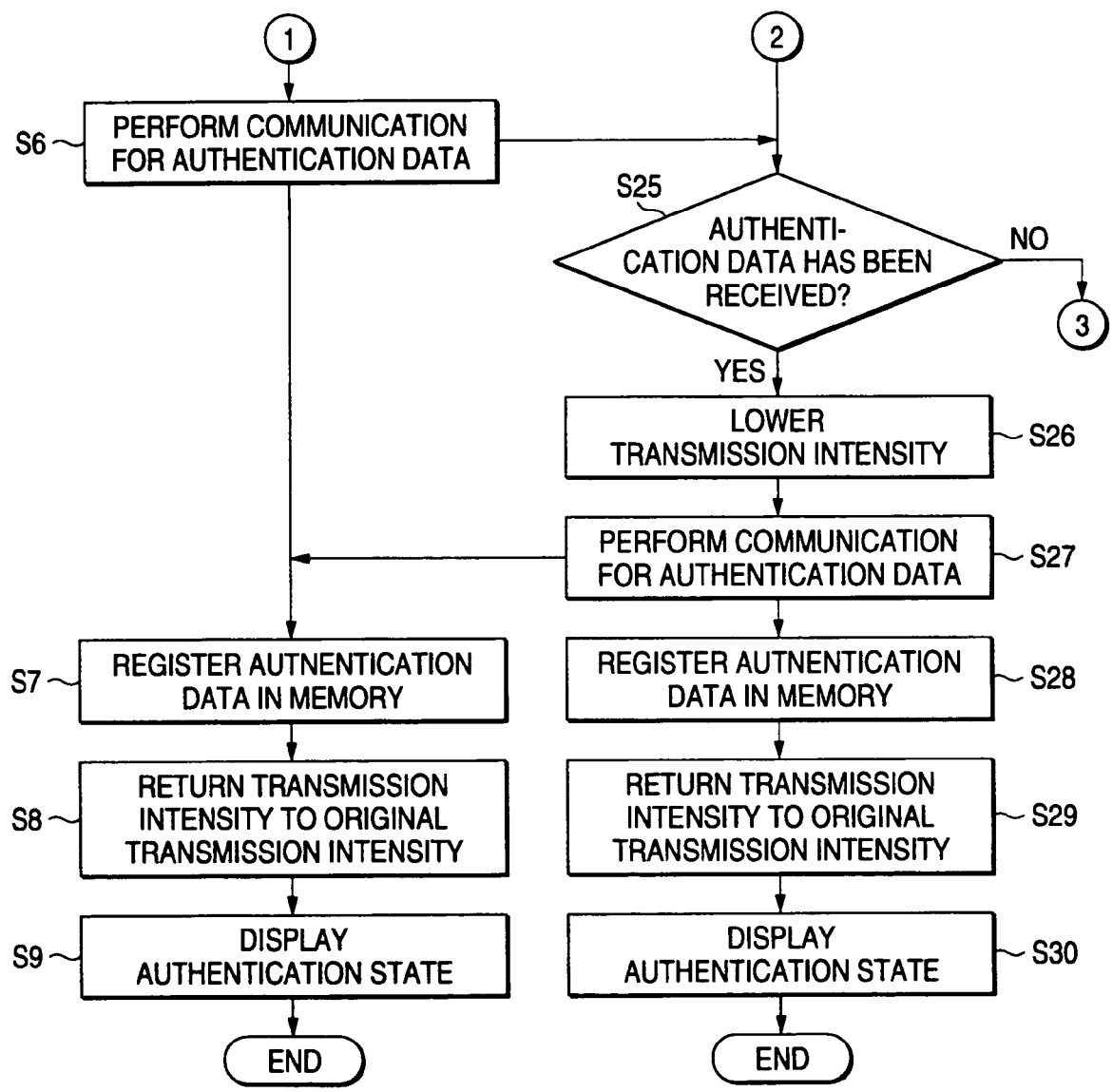
FIG. 12 is a flowchart explaining authentication processing of the radio communication system in FIG. 1.

When the transmission intensity is lowered by the transmission intensity changing unit 63, in step S6 in FIG. 12, the authentication processing unit 64 controls the radio reception unit 41 and the radio transmission unit 42 to execute communication of authentication data via the antenna 12, that is, execute authentication processing with the image pickup apparatus 2. The connection control unit 61 proceeds to step S7.

Since the authentication data is transmitted from the portable server 1 by the processing of step S6, in step S25 in FIG. 12, the authentication processing unit 64 of the image pickup apparatus 2 judges whether the authentication data has been received by the radio reception unit 151. If the authentication processing unit 64 judges that the authentication data has not been received by the radio reception unit 151, the connection control unit 61 returns to step S24 in FIG. 11 and repeats the processing of step S24 and the subsequent steps. If the authentication processing unit 64 judges in step S25 that the authentication data is received by the radio reception unit 151, in step S26, the authentication processing unit 64 of the image pickup apparatus 2 controls the transmission intensity changing unit 63 to lower the standardized transmission intensity to a required minimum transmission intensity that the antenna 12 of the portable server 1, which is in contact with or very close to the antenna 102, can receive and proceeds to step S27. In step S27, the authentication processing unit 64 controls the radio reception unit 151 and the radio transmission unit 152 to cause the portable server 1 to execute communication of the authentication data via the antenna 102, that is, execute authentication processing with the portable server 1 corresponding to the processing in step S6 of the portable server 1 and proceeds to step S28.

The authentication processing will be specifically explained. Actually, the authentication processing unit 64 of the portable server 1 controls the radio transmission unit 42 and requests a product ID of the image pickup apparatus 2 via the antenna 12. Then, the authentication processing unit 64 of the image pickup apparatus 2 controls the radio transmission unit 151 to transmit the product ID via the antenna 102. The authentication processing unit 64 of the portable server 1 generates a random number X and creates a first key from this random number X and the product ID of the image pickup apparatus 2 received by the radio reception unit 41 via the antenna 12. Further, the authentication processing unit 64 creates a second key from the first key and the product ID of the image pickup apparatus 2. The authentication processing unit 64 of the portable server 1 controls the radio transmission unit 42 to transmit the generated random number X to the image pickup apparatus 2 via the antenna 12. The authentication processing unit 64 of the image pickup apparatus 2 creates a first key from the random number X received by the radio reception unit 151 via the antenna 102 and the product ID of the image pickup apparatus 2 itself. Further, the authentication processing unit 64 creates a second key from the first key and the product ID of the image pickup apparatus 2 itself and controls the radio transmission unit 152 to transmit the second key to the portable server 1 as a code for authentication via the antenna 102. The authentication processing unit 64 of the portable server 1 collates the code for authentication received by the radio reception unit 41 via the antenna 12 and the generated second key. When the code for authentication and the second key are identical, the authentication processing unit 64 controls the radio transmission unit 42 to transmit encryption key data to the image pickup apparatus 2 via the antenna 12.

The authentication processing as described above is executed in step S6 and steps S25 to S28, and the portable server 1 and the image pickup apparatus 2 are subjected to mutual authentication. Consequently, the portable server 1 and the image pickup apparatus 2 acquire the product ID of the image pickup apparatus 2, the encryption key data, and the like as authentication data that is information required at the time of connection communication of the portable server 1 and the image pickup apparatus 2 after that (after authentication).

Thus, in step S7, the authentication processing unit 64 of the portable server 1 controls the authentication data registering unit 65 to register the authentication data acquired by reception or generation in the memory 32 and proceeds to step S8. In step S8, the authentication processing unit 64 controls the transmission intensity changing unit 63 to return the transmission intensity to the original transmission intensity (the transmission intensity standardized in the radio communication system) and proceeds to step S9. When the authentication processing is ended by the authentication processing unit 64, in step S9, the connection control unit 61 of the portable server 1 causes the indicator constituting the output unit 38 to display an authentication state indicating that the image pickup apparatus 2 has been authenticated in the portable server 1 and ends the authentication processing.

On the other hand, in step S28, the authentication processing unit 64 of the image pickup apparatus 2 controls the authentication data registering unit 65 to register the authentication data acquired by reception or generation in the memory 142 and proceeds to step S29. In step S29, the authentication processing unit 64 controls the transmission intensity changing unit 63 to return the transmission intensity to the original transmission intensity (the transmission intensity standardized in the radio communication system) and proceeds to step S30. When the authentication processing is ended by the authentication processing unit 64, in step S30, the connection control unit 61 of the image pickup apparatus 2 causes the display 111 to display an authentication state indicating that the portable server 1 has been authenticated in the image pickup apparatus 2 and ends the authentication processing.

As described above, since the portable server 1 and the image pickup apparatus 2 are subjected to mutual authentication, a user who has purchased a new apparatus can easily perform mutual authentication by bringing apparatuses, which the user wishes to authenticate, close to each other and can connect the apparatus and an existing apparatus by radio. In addition, since the authentication data, which is information required at the time of connection communication of the portable server 1 and image pickup apparatus 2 subjected to mutual authentication, is registered, once the apparatuses are authenticated, it is unnecessary to perform the authentication processing by bringing the apparatuses close to the distance, at which an authentication radio wave can be received, at the time of connection after authentication to be described later with referenced to FIG. 15.

In executing the authentication processing as described above, it is unnecessary to provide a communication unit for performing the authentication processing. In other words, since a place and cost for providing the communication unit are not required in the respective apparatuses, an increase in size of the apparatuses and an increase in cost can be controlled.

In addition, since the standardized transmission intensity is lowered to a required minimum transmission intensity that an antenna of another apparatus, which is in contact with or very close to an antenna of an apparatus, can receive. Thus, a radio wave is prevented from being intercepted by a third party.

Further, since authentication processing cannot be performed unless an authentication button is not turned ON, the portable server 1 in a bag can be prevented from being authenticated by a third party through the bag in a crowded place such as a crowded train. In addition, since an authentication radio wave is not transmitted unless the authentication button is pressed, reduction in power consumption can be realized.

Note that, in the above explanation, authentication processing is executed by turning ON authentication buttons in two apparatuses performing authentication. However, the authentication button may not be provided at all or may be provided in one of the apparatuses (e.g., the portable server 1 having a function for storing data).

The authentication button may be constituted by a software switch using a liquid crystal display and a touch panel. In this case, the same effect as in the case in which the authentication button is provided in the housing can be realized by setting the number of times of operation until the authentication switch is displayed on the display in response to an operation of the touch panel by a user to two or more (a maximum number of times of operation is a number that does not impose a burden on a user). In the case in which the touch panel is used, waste in size and cost caused by providing a switch exclusively used for authentication can be controlled.

Moreover, in the above explanation, the portable server 1 transmits an authentication radio wave. However, the image pickup apparatus 2 may transmit an authentication radio wave. In addition, it is also possible that both the portable server 1 and the image pickup apparatus 2 transmit authentication radio waves, respectively, and the one having received the transmitted authentication radio wave earlier transmits a response radio wave corresponding to the authentication radio wave.

Note that the same processing is also executed between the portable server 1 and the portable viewer 3 or between the image pickup apparatus 2 and the portable viewer 3, although an explanation of the processing will be omitted to avoid repetition.

Next, connection communication processing after the authentication processing is executed as described above, that is, connection communication processing of the radio communication system subjected to mutual authentication will be explained with reference to a flowchart in FIG. 15. Note that, in an example in FIG. 15, connection communication processing of the portable server 1 and the image pickup apparatus 2 subjected to mutual authentication in the authentication processing in FIGS. 11 and 12 will be explained. In this processing, a radio wave of the standardized transmission intensity is used in the portable server 1 and the image pickup apparatus 2.

The connection control unit 61 of the portable server 1 performs a timing operation using a clock incorporated therein. In step S41, the connection control unit 61 controls the radio transmission unit 42 to transmit a calling radio wave at a predetermined period via the antenna 12 and proceeds to step S42. This calling radio wave is a radio wave for confirming whether an apparatus subjected to mutual authentication is present in a range of several meters to several tens meters from the antenna 12, which is a range of a distance at which the radio reception unit 41 of the portable server 1 can receive a radio wave. Note that, in this case, the calling radio wave may be transmitted with a direct operation of a user (using a button or a touch panel) as a trigger.

In step S61, the connection control unit 61 of the image pickup apparatus 2 monitors the radio reception unit 151 and is on standby until the radio reception unit 151 receives a calling radio wave via the antenna 102. Since a calling radio wave is transmitted from the portable server 1 by the processing of step S41, the connection control unit 61 judges that the radio reception unit 151 has received the calling radio wave via the antenna 102 and proceeds to step S62. In step S62, the connection control unit 61 controls the radio transmission unit 152 to transmit a response radio wave corresponding to the received calling radio wave via the antenna 102 and proceeds to step S63. More specifically, in step S62, the connection control unit 61 of the image pickup apparatus 2 controls the authentication data readout unit 66 to read out authentication data, which is used in communication with the portable server 1 that has transmitted the calling radio wave, from the memory 142, encrypts the response radio wave corresponding to the calling radio wave with the read-out authentication data (encryption key data), and controls the radio transmission unit 152 to transmit the encrypted response radio wave via the antenna 102.

In step S42, the connection control unit 61 of the portable server 1 monitors the radio reception unit 41 and judges whether the radio reception unit 41 has received a response radio wave corresponding to a calling radio wave via the antenna 12. When it is judged that the radio reception unit 41 has not received a response radio wave via the antenna 12, the connection control unit 61 returns to step S41 and repeats the processing of step S41 and the subsequent steps.

Since the response radio wave is transmitted from the image pickup apparatus 2 by the processing of step S62, in response to this, in step S42, the connection control unit 61 of the portable server 1 judges that the radio reception unit 41 has received the response radio wave via the antenna 12 and proceeds to step S43. In step S43, the connection control unit 61 controls the authentication data readout unit 66 to read out authentication data, which is used in communication with the image pickup apparatus 2 that has transmitted the response radio wave, from the memory 32, decodes the received response radio wave using the read-out authentication data (encryption key data), and proceeds to step S44. In step S44, the connection control unit 6 judges whether the response radio wave decoded by the registered authentication data can be read, that is, the apparatus, which has sent the response radio wave, is an apparatus registered in the memory 32 (authenticated apparatus).

If the response radio wave decoded by the registered authentication data cannot be read in step S44, for example, when the response radio wave is not received by mistake or when a radio wave from an unauthenticated apparatus is received, it is judged that the apparatus, which has transmitted the response radio wave, is not an apparatus registered in the memory 32, the connection control unit 61 of the portable server 1 returns to step S41 and repeats the processing of step S41 and the subsequent steps. In other words, in step S41, the connection control unit 61 of the portable server 1 performs a timing operation using a clock incorporated therein, controls the radio transmission unit 42 to transmit a calling radio wave at a predetermined period via the antenna 12, and repeats the processing after that. Thus, the radio wave from the unauthenticated apparatus is not permitted to be connected in the portable server 1.

Note that, since radio communication is often performed in a public space, it is preferable that connection communication processing after this authentication is not intercepted by a third party. The processing of step S42 and the subsequent steps in the portable server 1 and the communication processing of step 62 and the subsequent steps in the image pickup apparatus 2 are executed by using an encryption system like the IEEE802.1X/EAP. Therefore, although not explained, the encryption and decoding as described above in step S44 and step S62 are also executed in the transmission and reception of step S45 and the subsequent steps and step S63 and the subsequent steps.

On the other hand, when the response radio wave decoded by the registered authentication data can be read, in step S44, the connection control unit 61 of the portable server 1 judges that the apparatus, which has transmitted the response radio wave, is an apparatus registered in the memory 32 and proceeds to step S45. In step S45, the connection control unit 61 controls the radio transmission unit 42 to transmit a connection permission signal via the antenna 12 and proceeds to step S46.

On the other hand, in step S63, the connection control unit 61 of the image pickup apparatus 2 monitors the radio reception unit 151 and judges whether a connection permission signal has been received via the antenna 102. If it is judged that the radio reception signal unit 151 has received the connection permission signal via the antenna 102, the connection control unit 61 proceeds to step S64, controls the radio transmission unit 152 to transmit a confirmation signal corresponding to the connection permission signal via the antenna 102, and proceeds to step S65.

When it is judged in step S63 that the radio reception unit 151 has not received a connection permission signal via the antenna 102, the connection control unit 61 of the image pickup apparatus 2 returns to step S61 and repeats the processing of step S61 and the subsequent steps.

In step S65, the connection control unit 61 of the image pickup apparatus 2 causes the display 111 to display a connection state indicating that the portable server 1 is connected in the image pickup apparatus 2 and proceeds to step S66. A user looks at the connection state displayed on the display 111 to confirm that the portable server 1 is connected, operates the control button 112, and instructs, for example, to transmit video data to the portable server 1. Thus, in step S66, the connection control unit 61 of the image pickup apparatus 2 controls the data communication unit 67 to execute data communication processing with the portable server 1 and ends the connection communication processing.

On the other hand, in step S46, the connection control unit 61 of the portable server 1 monitors the radio reception unit 41 and judges whether a confirmation signal corresponding to a connection permission signal has been received via the antenna 12. If it is judged that the radio reception unit 41 has not received a confirmation signal from the antenna 12 via the antenna 12, the connection control unit 61 returns to step S45 and repeats the processing of step S45 and the subsequent steps. Since a confirmation signal is transmitted from the image pickup apparatus 2 by the processing of step S64, in step S46, the connection control unit 61 of the portable server 1 judges that the radio reception unit 41 has received the confirmation signal via the antenna 12 and proceeds to step S47. In step S47, the connection control unit 61 causes the indicator constituting the output unit 38 to display a connection state indicting that the image pickup apparatus 2 is connected in the portable server 1 and proceeds to step S48.

Since the image pickup apparatus 2 executes data communication processing in step S66 and transmits data, the data communication unit 67 of the portable server 1 receives the data. In response to this, in step S48, the connection control unit 61 of the portables server 1 controls the data communication unit 67, executes data communication processing with the image pickup apparatus 2, and ends the connection communication processing.

As described above, connection processing by a radio communication unit is executed using a radio wave of the standardized transmission intensity after mutual authentication, and connection is confirmed. Then, data communication is executed. Therefore, authentication processing, in which a reception intensity is limited (i.e., a reception distance is limited) more than the case of ordinary data communication, is unnecessary. Thus, it is also unnecessary to bring apparatuses close to each other for authentication every time the authentication is performed. This makes it possible to perform communication at a distance longer than that in the case in which authentication is performed.

Note that, here, concerning a period in which mutual authentication is valid (i.e., a period in which the connection processing in FIG. 15 can be executed even if mutual authentication is not performed), in order to minimize complication with respect to an operation by a user, it is most preferable that, as described above, an apparatus is registered almost permanently if the apparatus is authenticated once. This fixes encryption in communication permanently for each apparatus. Thus, in connection requiring high level of security, an apparatus side may request re-authentication every time an apparatus makes connection or in every fixed period (e.g., every twenty-four hours). Consequently, further security protection can be realized between apparatuses to be connected.

In addition, in the above explanation, the portable server 1 transmits a calling radio wave. However, the image pickup apparatus 2 may transmit a calling radio wave. It is also possible that both the portable server 1 and the image pickup apparatus 2 transmit calling radio waves, respectively, and the one having received the transmitted calling radio wave earlier transmits a response radio wave corresponding to the calling radio wave.

The portable server 1 or the image pickup apparatus 2 may transmit a calling radio wave in response to an operation of control buttons or the like by a user. In this case, since the calling radio wave is not transmitted when the user does not instruct the transmission, reduction in power consumption can be realized.

In addition, the same processing is also executed between the portable server 1 and the portable viewer 3 or between the image pickup apparatus 2 and the portable viewer 3, although an explanation of the processing will be omitted to avoid repetition.

Figure 16:
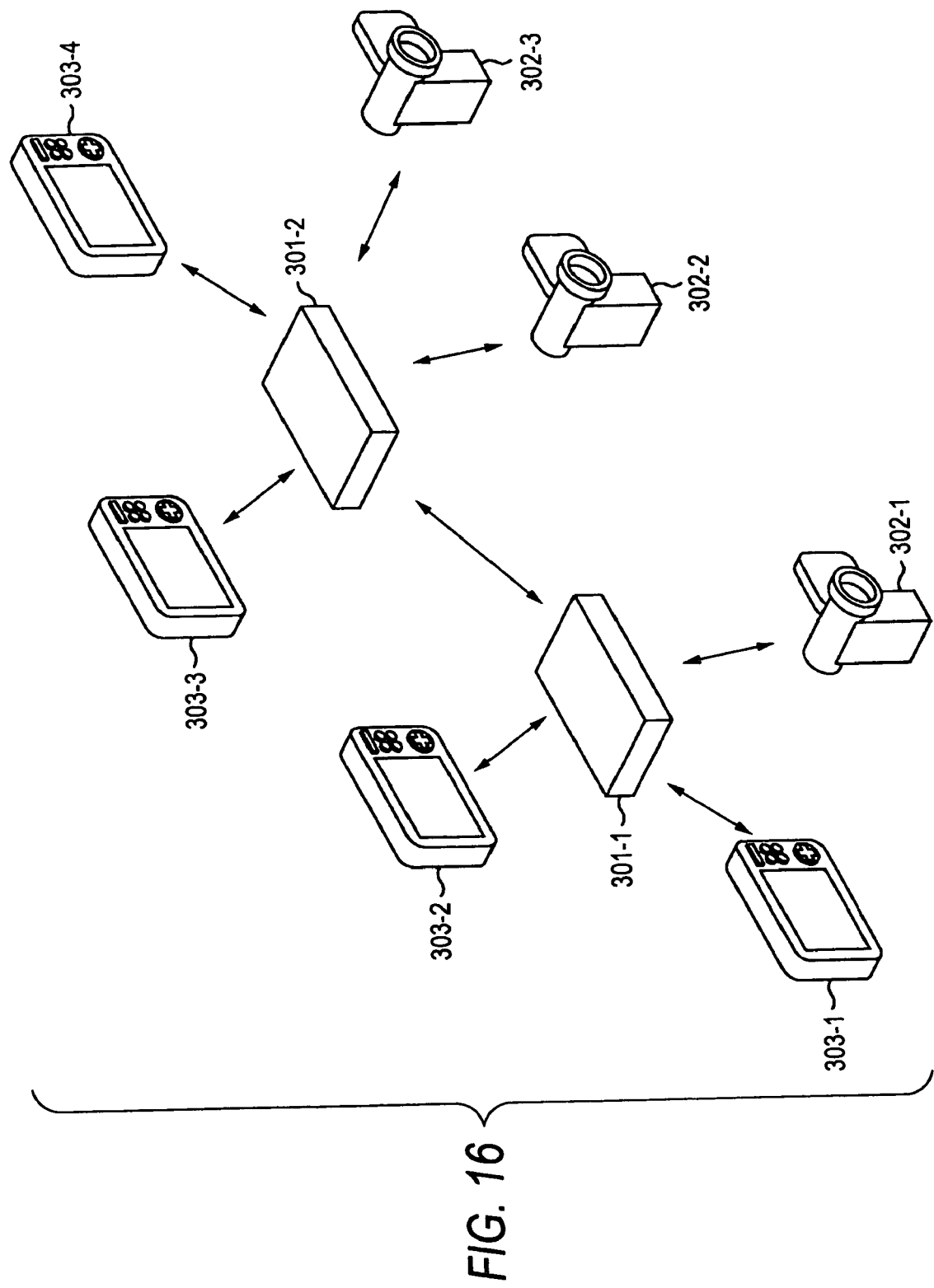
FIG. 16 is a diagram showing an example of another structure of the radio communication system according to the invention.

FIG. 16 shows an example of another structure of the radio communication system in FIG. 1. In FIG. 16, a portable server 301-1 and a portable server 301-2 are connected to each other. An image pickup apparatus 302-1 and portable viewers 303-1 and 302-2 are connected to the portable server 301-1, and an image pickup apparatuses 302-2 and 302-3 and portable viewers 303-3 and 303-4 are connected to the portable server 301-2. In other words, the radio communication system in FIG. 16 is constituted by a hub-like radio network with the portable servers 301-1 and 301-2 in the center of the radio communication system.

Note that the portable servers 301-1 and 301-2, the image pickup apparatuses 302-1 to 302-3, and the portable viewers 303-1 to 303-4 are hereinafter generally referred to as the portable server 301, the image pickup apparatus 302, and the portable viewer 303, respectively, when it is unnecessary to distinguish the portable servers 301-1 and 301-2, the image pickup apparatuses 302-1 to 302-3, and the portable viewers 303-1 to 303-4.

The portable server 301 has basically the same structure as the portable server 1 in FIG. 1. Although a detailed explanation of the structure will be omitted to avoid repetition, the portable server 301 is an information processing apparatus that is a portable and wireless version of a home server centrally managing video data and the like in a user's home. The portable server 301 has a main storage function for the image pickup apparatus 302 and the portable viewer 303. The image pickup apparatus 302 has basically the same structure as the image pickup apparatus 2 in FIG. 1. Although a detailed explanation of the structure will be omitted to avoid repetition, the image pickup apparatus 302 encodes a video picked up by a user into the MPEG2 or the like and transmits the encoded video data to the portable server 301. The portable viewer 303 has basically the same structure as the portable viewer 3 in FIG. 1. Although a detailed explanation of the structure will be omitted to avoid repetition, the portable viewer 303 performs reproduction processing for video data stored in the portable server 301 and displays a reproduced video on a display incorporated therein. Note that voice data is not shown in the example in FIG. 16 as well.

In this radio communication system, as in the radio communication system in FIG. 1, the portable server 301, the image pickup apparatus 302, and the portable viewer 303 are connected by radio. In order to prevent an impertinent third party from making connection from the viewpoint of security management and copyright protection, in the respective apparatuses, transmission intensities of radio waves are set substantially the same, and when a reception intensity of a received radio wave is larger than a threshold value set in advance, authentication processing is executed. In other words, in the portable server 301, the image pickup apparatus 302, and the portable viewer 303, since transmission intensities of radio waves to be transmitted are standardized and substantially the same, two apparatuses (e.g., the portable server 301-1 and the portable server 301-2) communicating with each other are required to be closer to each other than a specific distance in order to make a reception intensity larger than the threshold value.

Therefore, in this case, as in the radio communication system in FIG. 1, a reception intensity, at which the specific distance is several millimeters to several centimeters, is set as the threshold value, whereby authentication processing is executed only when the portable server 301-1 and the portable server 301-2 are brought into contact with each other or into a state close to the contact (i.e., into a range closer than several millimeters to several centimeters). Moreover, at the time of authentication, a transmission intensity at the time of transmission is lowered such that a radio wave is not intercepted in locations other than a location between the portable server 301-1 and the portable server 301-2. Then, a radio wave with the lowered transmission intensity is used, and the authentication processing is executed, whereby mutual authentication between the portable server 301-1 and the portable server 301-2 is established.

The processing as described above is also executed between the portable server 301-1 and the image pickup apparatus 302-1 as well as between the portable server 301-1 and the portable viewers 303-1 and 303-2, respectively, and mutual authentication is performed among the respective apparatuses of the radio communication system. Consequently, thereafter, the image pickup apparatus 302-1 and the portable viewers 303-1 and 303-2 can execute connection communication processing with the portable server 301-1, respectively, in the same manner as the connection communication processing described above with reference to FIG. 15.

In the same manner, the authentication processing is also executed between the portable server 301-2 and the image pickup apparatuses 302-2 and 302-3 as well as between the portable server 301-2 and the portable viewers 303-3 and 303-4, respectively, and mutual authentication is performed among the respective apparatuses of the radio communication system. Consequently, thereafter, the image pickup apparatuses 302-2 and 302-3 and the portable viewers 303-3 and 303-4 can execute connection communication processing with the portable server 301-2, respectively, in the same manner as the connection communication processing described above with reference to FIG. 15.

Therefore, in the radio communication system in FIG. 16, for example, when a user wishes to connect the image pickup apparatus 302-1 and the portable viewer 303-1, which are connected to the portable server 301-1, to perform communication, communication is performed via the portable server 301-1. In other words, the connection communication processing described above with reference to FIG. 15 is executed between the portable server 301-1 and the image pickup apparatus 302-1 and further executed between the portable server 301-1 and the portable viewer 303-1, whereby data communication can be performed between the image pickup apparatus 302-1 and the portable viewer 303-1 via the portable server 301-1. In this case, the data communication may be executed on a real time basis or may be performed after being buffered in a hard disk of the portable server 301-1. Note that, in the case in which the image pickup apparatus 302-1 and the portable viewer 303-1 are connected on a real time basis, the portable server 301-1 is required to have a function that allows two or more lines to make connection simultaneously.

In addition, for example, when a user wishes to connect the image pickup apparatus 302-1 connected to the portable server 301-1 and the portable viewer 303-3 connected to the portable server 301-2 to perform communication, communication is performed via the portable server 301-1 and the portable server 301-2. In other words, the connection communication processing described above with reference to FIG. 15 is executed between the portable server 301-1 and the image pickup apparatus 302-1, executed between the portable server 301-2 and the portable viewer 303-3, and further executed between the portable server 301-1 and the portable server 301-2, whereby data communication can be performed between the image pickup apparatus 302-1 and the portable viewer 303-3 via the portable server 301-1 and the portable server 301-2.

As described above, in the radio communication system in FIG. 16, the image pickup apparatus 302-1 and the portable viewer 303-1, which are connected to the portable server 301-1, can perform data communication via the portable server 301-1 even if authentication processing is not performed between the image pickup apparatus 302-1 and the portable viewer 303-1. In addition, the image pickup apparatus 302-1 connected to the portable server 301-1 and the portable viewer 303-3 connected to the portable server 301-2 can perform data communication via the portable server 301-1 and the portable server 301-2.

This radio communication system is constituted as a radio network having the portable server 301 as a hub. This prevents a situation in which, when there are many apparatuses to be connected to the radio communication system, if the apparatuses can make connection to each other freely, a network and authentication processing and management are extremely complicated in accordance with an increase in the number of apparatuses, and a burden on a user involved in authentication increases.

Note that, in FIG. 16, the radio communication system is constituted by a hub-like network. However, the radio communication system is not limited to be constituted by the hub-like network but may be constituted by other networks. In this case, although it is likely that authentication management is complicated when the number of apparatuses increases as described above, there is an advantage that the apparatuses can make connection to each other freely.

In the above explanation, the portable server, the image pickup apparatus, and the portable viewer are used. However, the invention is not limited to the portable server, the image pickup apparatus, and the portable viewer. The invention is also applied to portable terminals such as a cellular phone, a personal computer, a PDA (Personal Digital Assistant), a digital still camera, and a headphone stereo. In addition, the invention can also be applied to other servers (home servers), although the servers are not portable.

The series of processing described above can be executed not only by hardware but also by software. In the case in which the processing is executed by software, for example, the portable server 1 in FIG. 3, the image pickup apparatus 2 in FIG. 7, and the portable viewer 3 in FIG. 10 are constituted by an information processing apparatus 401 as shown in FIG. 17.

Figure 17:
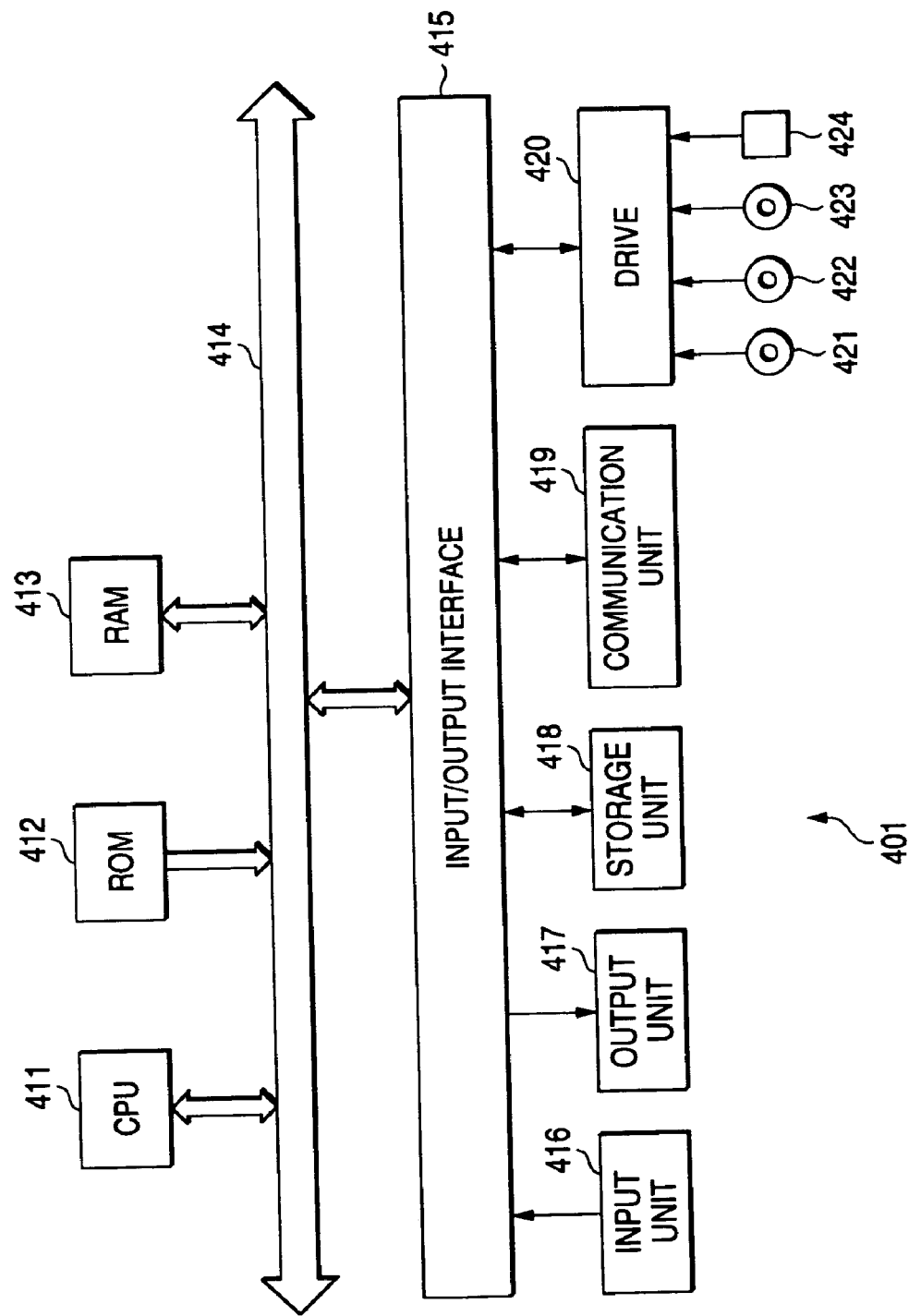
FIG. 17 is a diagram showing an example of a structure of an information processing apparatus according to the invention.

In FIG. 17, a CPU (Central Processing Unit) 411 executes various kinds of processing in accordance with a program stored in a ROM (Read Only Memory) 412 or a program loaded to a RAM (Random Access Memory) 413 from a storage unit 418. In addition, data and the like, which are required when the CPU 411 executes the various kinds of processing, are stored in the RAM 413 according to circumstances.

The CPU 411, the ROM 412, and the RAM 413 are connected to each other via a bus 414. An input/output interface 415 is also connected to this bus 414.

An input unit 416 consisting of a keyboard, a mouse, or the like, an output unit 417 consisting of a display, which consists of a CRT (Cathode Ray Tube), an LCD (Liquid Crystal Display), or the like, or a speaker, a storage unit 418 including a hard disk or the like, and a communication unit 419 including a modem and a terminal adapter are connected to the input/output interface 415. The communication unit 419 performs communication processing via a not-shown network.

A drive 420 is connected to the input/output interface 415 as required, and a magnetic disk 421, an optical disk 422, a magneto-optical disk 423, or a semiconductor memory 424 are mounted on the drive 420 according to circumstances. A computer program read out from the magnetic disk 421, the optical disk 422, the magneto-optical disk 423, or the semiconductor memory 424 is installed in the storage unit 418 as required.

In the case in which the series of processing is executed by software, a program constituting the software is installed in a computer, which is incorporated in dedicated hardware, or a general-purpose personal computer or the like, which is capable of executing various functions by installing various programs, from a network or a recording medium.

As shown in FIG. 17, this recording medium is distributed separately from an apparatus body in order to provide a user with the program. The recording medium is not only constituted by a package medium consisting of the magnetic disk 421 (including a flexible disk), the optical disk 422 (including a CD-ROM (Compact Disk-Read Only Memory) and a DVD (Digital Versatile Disk)), the magneto-optical disk 423 (including an MD (Mini-disk) (registered trademark)), or the semiconductor memory 424 but also constituted by the ROM 412 having the program recorded therein, the hard disk included in the storage unit 418, and the like that are provided to a user in a state in which the ROM 412, the hard disk, or the like is incorporated in the apparatus body in advance.

Note that, in this specification, the steps shown in the flowcharts include not only processing to be performed in a time series manner in accordance with the described order but also processing to be executed in parallel or individually, although not always performed in a time series manner.

In this specification, the system represents an entire apparatus constituted by plural apparatuses.

According to the invention, mutual authentication can be performed easily at low cost. In addition, according to the invention, data communication can be performed safely and easily.

What is claimed is:

1. A communication system comprising:
   a first information processing apparatus including a first operation input unit and configured to transmit an authentication request radio wave at a first transmission intensity after the first operation input unit is activated by a user;

a second information processing apparatus including a second operation input unit and configured to receive the authentication request radio wave transmitted at the first transmission intensity, and transmit a response radio wave at the first transmission intensity after the second operation input unit is activated;

the first information processing apparatus is configured to receive the response radio wave, judge that the second information processing apparatus is within a range of physical proximity based on a reception intensity of the received response radio wave being larger than a reception intensity set in advance which defines the range of physical proximity, and transmit a request for a product ID of the second information processing apparatus at a second radio transmission intensity that is lower than the first radio transmission intensity;

the second information processing apparatus is further configured to receive the request for the product ID and transmit the product ID at the second radio transmission intensity;

the first information processing apparatus is further configured to receive the product ID of the second information processing apparatus, generate a random number, create a first key from the random number and the received product ID of the second information processing apparatus, create a second key from the first key and the product ID of the second information processing apparatus, and transmit the random number to the second information processing apparatus at the second radio transmission intensity;

the second information processing apparatus is further configured to receive the random number from the first information processing apparatus, create a third key from the product ID and the received random number, create a fourth key from the third key and the product ID, store the fourth key as a code for authentication, and transmit the fourth key to the first information processing apparatus at the second radio transmission intensity;

the first information processing apparatus is further configured to receive the fourth key from the second information processing apparatus, determine if the received fourth key is identical to the second key, store an indication that the second information processing apparatus is authenticated based on a result of the determination, and transmit first data to the second information processing apparatus at the first radio transmission intensity based on the stored indication that the second information processing apparatus is authenticated; and the second information processing apparatus is further configured to receive the first data and transmit second data to the first information processing apparatus at the first radio transmission intensity based on the stored code for authentication.

2. An information processing apparatus comprising:
an operation input unit;
a radio transmission unit configured to transmit an authentication request radio wave to another information processing apparatus at a first transmission intensity after the first operation input unit is activated by a user;
a radio reception unit configured to receive a response radio wave from the other information processing apparatus;
a radio wave intensity judging unit configured to judge that the other information processing apparatus is within a range of physical proximity based on a reception intensity of the received response radio wave being larger than a reception intensity set in advance which defines the range of physical proximity;

the radio transmission unit is further configured to transmit a request for a product ID of the other information processing apparatus at a second radio transmission intensity that is lower than the first radio transmission intensity;

the radio reception unit is further configured to receive the product ID of the other information processing apparatus, generate a random number, create a first key from the random number and the received product ID of the other information processing apparatus, and create a second key from the first key and the product ID of the other information processing apparatus;

the radio transmission unit is further configured to transmit the random number to the other information processing apparatus at the second radio transmission intensity;

the radio reception unit is further configured to receive a third key from the other information processing apparatus, determine if the received third key is identical to the second key, and store an indication that the second information processing apparatus is authenticated based on a result of the determination; and the radio transmission unit is further configured to transmit first data to the other information processing apparatus at the first radio transmission intensity based on the stored indication that the other information processing apparatus is authenticated.

3. An information processing method comprising:
transmitting an authentication request radio wave to another information processing apparatus at a first transmission intensity after a first operation input unit is activated by a user;
receiving a response radio wave from the other information processing apparatus;
judging that the other information processing apparatus is within a range of physical proximity based on a reception intensity of the received response radio wave being larger than a reception intensity set in advance which defines the range of physical proximity;
transmitting a request for a product ID of the other information processing apparatus at a second radio transmission intensity that is lower than the first radio transmission intensity;
receiving the product ID of the other information processing apparatus;
generating a random number;
creating a first key from the random number and the received product ID of the other information processing apparatus;
creating a second key from the first key and the product ID of the other information processing apparatus;
transmitting the random number to the other information processing apparatus at the second radio transmission intensity;
receiving a third key from the other information processing apparatus;
determining if the received third key is identical to the second key;
storing an indication that the second information processing apparatus is authenticated based on a result of the determination; and
transmitting first data to the other information processing apparatus at the first radio transmission intensity based on the stored indication that the other information processing apparatus is authenticated.

4. A recording medium storing computer program instructions, which, when executed by a computer, cause the computer to perform an information processing method comprising:

transmitting an authentication request radio wave to another information processing apparatus at a first transmission intensity after a first operation input unit is activated by a user;

receiving a response radio wave from the other information processing apparatus; judging that the other information processing apparatus is within a range of physical proximity based on a reception intensity of the received response radio wave being larger than a reception intensity set in advance which defines the range of physical proximity;

transmitting a request for a product ID of the other information processing apparatus at a second radio transmission intensity that is lower than the first radio transmission intensity;

receiving the product ID of the other information processing apparatus; generating a random number;

creating a first key from the random number and the received product ID of the other information processing apparatus;

creating a second key from the first key and the product ID of the other information processing apparatus;

transmitting the random number to the other information processing apparatus at the second radio transmission intensity;

receiving a third key from the other information processing apparatus; determining if the received third key is identical to the second key;

storing an indication that the second information processing apparatus is authenticated based on a result of the determination; and transmitting first data to the other information processing apparatus at the first radio transmission intensity based on the stored indication that the other information processing apparatus is authenticated.

\* \* \* \* \*